(12) United States Patent
Amchislavsky et al.

(10) Patent No.: US 9,087,163 B2
(45) Date of Patent: Jul. 21, 2015

(54) TRANSMISSION OF MULTIPLE PROTOCOL DATA ELEMENTS VIA AN INTERFACE UTILIZING A DATA TUNNEL

(75) Inventors: Mikhail Amchislavsky, Cupertino, CA (US); Kai Shen, Shanghai (CN); Hiroaki Sakita, Yokohama (JP); Qiang Yuan, Shenzhen (CN); Jason Wong, Saratoga, CA (US); Lei Ming, San Jose, CA (US); Ross Gordon, San Jose, CA (US); Stephen J. Smith, Morgan Hill, CA (US); Conrad A. Maxwell, Herriman, UT (US); David Kuo, Milpitas, CA (US); Bill Huang, San Jose, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 350 days.

(21) Appl. No.: 13/546,904

(22) Filed: Jul. 11, 2012

(65) Prior Publication Data

US 2014/0019653 A1    Jan. 16, 2014

(51) Int. Cl.
*G06F 13/42* (2006.01)
*G06F 13/38* (2006.01)
*G06F 3/14* (2006.01)

(52) U.S. Cl.
CPC *G06F 13/42* (2013.01); *G06F 3/14* (2013.01); *G06F 13/385* (2013.01); *G06F 13/387* (2013.01)

(58) Field of Classification Search
CPC .................................................. G06F 9/4411
USPC .............. 710/104–110, 305–311, 58–61
See application file for complete search history.

(56) References Cited

U.S. PATENT DOCUMENTS

| 6,598,103 B2 * | 7/2003 | MacWilliams et al. ........ 710/105 |
| 7,987,488 B2 * | 7/2011 | Mouri et al. .................... 725/78 |
| 2009/0178097 A1 | 7/2009 | Kim et al. |
| 2009/0238212 A1 | 9/2009 | Roethig et al. |
| 2009/0248924 A1 | 10/2009 | Melin |
| 2010/0100200 A1 | 4/2010 | Kim et al. |
| 2012/0003863 A1 * | 1/2012 | Sung et al. ...................... 439/489 |
| 2012/0068538 A1 | 3/2012 | Ye et al. |
| 2013/0009864 A1 * | 1/2013 | Jeong ............................. 345/156 |

(Continued)

OTHER PUBLICATIONS

"Enabling the Mobile HD Video Ecosystem," White Paper, Silicon Image, Inc., Oct. 2010, 10 pages.

(Continued)

*Primary Examiner* — Raymond Phan
(74) *Attorney, Agent, or Firm* — Fenwick & West LLP

(57) ABSTRACT

Embodiments of the invention are generally directed to transmission of multiple protocol data elements via an interface utilizing a data tunnel over a control channel. An embodiment of an apparatus includes a transmitter or receiver for the transmission or reception of data; a processing element for handling the data of the apparatus; and a connector for the transfer of the data, the connector to connect to a data channel and to connect to a control channel. The processing element is to provide for transfer of data of a first protocol in the control channel, the transfer of data via the control channel including the use of one or more generic commands of the first protocol for the transfer of data of a second protocol. Data of the second protocol is optimized before the data of the second protocol is sent over the first protocol, and the data transfer in the data channel and data transfer in the control channel are simultaneous at least in part.

33 Claims, 25 Drawing Sheets

(56) References Cited

U.S. PATENT DOCUMENTS

| | | | |
|---|---|---|---|
| 2013/0152149 A1* | 6/2013 | Park et al. | 725/114 |
| 2013/0223293 A1* | 8/2013 | Jones et al. | 370/276 |
| 2013/0309911 A1* | 11/2013 | Hsu | 439/660 |
| 2013/0326092 A1* | 12/2013 | Kang et al. | 710/8 |
| 2014/0078391 A1* | 3/2014 | Lin et al. | 348/441 |
| 2014/0122757 A1* | 5/2014 | Barrett et al. | 710/107 |

OTHER PUBLICATIONS

"High-Definition Multimedia Interface Specification Version 1.3," HDMI Licensing, LLC, Jun. 22, 2006, 237 pages.

"Sil1292 MHL / HDMI-to-HDMI Bridge," Product Brief, Silicon Image, Inc., 2010, 1 page.

"Sil9244 MHL Transmitter," Product Brief, Silicon Image, Inc., 2010, 1 page.

"Sil9292 MHL-to-HDMI Bridge," Product Brief, Silicon Image, Inc., 2010, 1 page.

"Universal Serial Bus Micro-USB Cables and Connectors Specification Revision 1.01," USB Implementers Forum, Inc., Apr. 4, 2007, 36 pages.

International Search Report and Written Opinion of the International Searching Authority dated Aug. 21, 2013, in International Patent Application No. PCT/US2013/040331, 9 pages.

* cited by examiner

```
struct mdt_event_header_t {
    unsigned char isNotLast      :1;// used for aggregation ( 0=LAST, 1=not LAST)
    unsigned char isKeyboard     :1;// Keyboard or mouse
    unsigned char isPortB        :1;// USB port indicator (0 or 1)
    unsigned char isHID          :1;// HID header indicator (1 = MDT, HID packet)
};
```

```
struct mdt_touch_bits_t{                    struct mdt_touch_XYZ_t {
    unsigned char    isTouched :1;              unsigned char    xy_wrodLen=[2][2];
    unsigned char    contactID :2;              unsigned char    vendor_specific:14;
}                                           }
struct mdt_mouse_XYZ_t {                    struct mdt_game_XYZRz_t {
    unsigned char    xyz_byteLen[3];            unsigned char    xyzRz_byteLen[4];
    unsigned char    reserved:24;               unsigned char    buttons_ex;
};                                              unsigned char    dPad:4;
                                                unsigned char    deviceID:2;
struct mdt_mouse_XYZ_VS_t {                 };
    unsigned char    xyz_byteLen[3];
    unsigned char    vendor_specific:22;
};
```

FIG. 4A

```
struct mdt_cursor_event_t    {          // 4 bytes or 7 bytes
  union {
    struct mdt_touch_bits_t touchBits;//(isNotMouse==1)
    unsigned char       button:3;//(isNotMouse==0)
  }
  unsigned char       isNotMouse:1;
  struct mdt_event_header_t    header;
  union {
    mdt_mouse_XYZ_t     mouseXYZ; //(!IsNotLast)
    struct {
      union {
        mdt_mouse_XYZ_VS_t  mouseXYZ;//(!IsNotMouse)
        mdt_touch_XYZ_t     touchXYZ;//(IsNotMouse) && (!IsGame)
        mdt_game_XYZRz_t    gameXYZRz;//(IsNotMouse) && (IsGame)
      };
      unsigned char       reserved:1;
      unsigned char       isGame:1;
    }
  }
};
```

```
struct mdt_keyboard_event_t {           // 4 or 7 bytes
  unsigned char           modifier_keys:3;
  unsigned char           reserved  :1;//set to 0
  struct mdt_event_header_t   header;
  union {
    struct {
      unsigned char       keycodesMin[3];
      unsigned char       reserved [3];
    } truncated;
    unsigned char         keycodesMax[6];
  };
};
```

```
union mdt_event {//4 or 7 bytes each
  mdt_cursor_event_t    cursor_event;
  mdt_keyboard_event_t  keyboard_event;
};
```

```
struct mdt_burst_01_t{// 6, 9, 13, or 16 bytes
  unsigned char ADOPTER_ID[2];
  mdt_event             events[2];
};
```

MDT BURST packet ("union mdt_event")

| REG | Name | 7 | 6 | 5 | 4 | 3 | 2 | 1 | 0 |
|---|---|---|---|---|---|---|---|---|---|
| 0x00: 0x01 | ADOPTER_ID[0:1] | | | | ADOPTER_ID[0:1] | | | | |
| 0x02: 0x08 | MDT_EVENT_0[0:6] | | | | MDT_EVENT_0[0:6] | | | | |
| 0x09: 0x0F | MDT_EVENT_1[0:6] | | | | MDT_EVENT_1[0:6] | | | | |

MDT_EVENT for keyboards (struct mdt_keyboard_event_t) with truncated, trailing 0s in series to offer lower latency)

| REG | Name | 7 | 6 | 5 | 4 | 3 | 2 | 1 | 0 |
|---|---|---|---|---|---|---|---|---|---|
| 0x00 | MDT_HEADER LEFT MOD. KEYS | isHID | isPortB | isKey-board = 1 | isNotLast = 0 | RSVD = 0 | LEFT ALT | LEFT SHIFT | LEFT CTRL |
| 0x01: 0x03 | KEYCODE [1:3] | | | | KEYCODE [1:3] | | | | |
| 0x04: 0x06 | KEYCODE [4:6] | | | | RSVD. VALUE is a don't care. | | | | |

MDT_EVENT for keyboards (mdt_keyboard_event) with more than 3 key codes or are packaged into a WRITE_BURST with a 2nd event.

| REG | Name | 7 | 6 | 5 | 4 | 3 | 2 | 1 | 0 |
|---|---|---|---|---|---|---|---|---|---|
| 0x00 | MDT_HEADER LEFT MOD. KEYS | isHID | isPortB | isKey-board = 1 | isNotLast = 1 | RSVD = 0 | LEFT ALT | LEFT SHIFT | LEFT CTRL |
| 0x01: 0x03 | KEYCODE [1:3] | | | | KEYCODE [1:3] | | | | |
| 0x04: 0x06 | KEYCODE [4:6] | | | | KEYCODE [4:6] | | | | |

MDT_EVENT for mice that adhere to boot protocol or support a 4 byte HID event and use relative coordinates. ("mdt_cursor_event_t" when it contains "mdt_mouse_XYZ_t")

| REG | Name | 7 | 6 | 5 | 4 | 3 | 2 | 1 | 0 |
|---|---|---|---|---|---|---|---|---|---|
| 0x00 | MDT_HEADER LEFT MOD. KEYS | isHID | isPortB | isKey-board = 0 | isNotLast = 0 | isNot Mouse = 0 | Button 3 | Button 2 | Button 1 |
| 0x01 | XYZ_BYTELEN[0] | X RELATIVE_DISPLACEMENT | | | | | | | |
| 0x02 | XYZ_BYTELEN[1] | Y RELATIVE_DISPLACEMENT | | | | | | | |
| 0x03 | XYZ_BYTELEN[2] | Z_RELATIVE_DISPLACEMENT (scroll wheel) | | | | | | | |
| 0x04: 0x06 | RESERVED | RSVD. VALUE is a don't care. | | | | | | | |

MDT_EVENT for mice that require vendor specific function or are packaged into a WRITE_BURST with a 2nd event. ("mdt_cursor_event_t" when it contains "mdt_mouse_XYZ_VS_t")

| REG | Name | 7 | 6 | 5 | 4 | 3 | 2 | 1 | 0 |
|---|---|---|---|---|---|---|---|---|---|
| 0x00 | MDT_HEADER LEFT MOD. KEYS | isHID | isPortB | isKeyboard = 0 | isNotLast = 1 | isNotMouse = 1 | Button 3 | Button 2 | Button 1 |
| 0x01 | XYZ_BYTELEN[0] | X_RELATIVE_DISPLACEMENT ||||||||
| 0x02 | XYZ_BYTELEN[1] | Y_RELATIVE_DISPLACEMENT ||||||||
| 0x03 | XYZ_BYTELEN[2] | Z_RELATIVE_DISPLACEMENT (scroll wheel) ||||||||
| 0x04: 0x05 | VENDOR_SPECIFIC [0:1] | VENDOR_SPECIFIC[0:1] ||||||||
| 0x06 | VENDOR_SPECIFIC | isGAME = 1 | RSVD | VENDOR_SPECIFIC ||||||

FIG. 5E

MDT_EVENT for game controllers. ("mdt_cursor_event_t" when it contains "mdt_touch_XYZ_t touchXYZ")

| REG | Name | 7 | 6 | 5 | 4 | 3 | 2 | 1 | 0 |
|---|---|---|---|---|---|---|---|---|---|
| 0x00 | MDT_HEADER LEFT MOD. KEYS | isHID | isPortB | isKey-board = 0 | isNotLast = 1 | isNot Mouse = 1 | Button 3 | Button 2 | Button 1 |
| 0x01 | XYZRz_BYTELEN[0] | X_RELATIVE_DISPLACEMENT (X for 1st analog stick) ||||||||
| 0x02 | XYZRz_BYTELEN[1] | Y_RELATIVE_DISPLACEMENT (X for 1st analog stick) ||||||||
| 0x03 | XYZRz_BYTELEN[2] | Z_RELATIVE_DISPLACEMENT (X for 2nd analog stick) ||||||||
| 0x04 | XYZRz_BYTELEN[2] | Rz_RELATIVE_DISPLACEMENT (Y for 2nd analog stick) ||||||||
| 0x05 | BUTTONS_EXT | BUTTON 11 | BUTTON 10 | BUTTON 9 | BUTTON 8 | BUTTON 7 | BUTTON 6 | BUTTON 5 | BUTTON 4 |
| 0x06 | ID and DPAD | isGAME = 1 | RSVD | Device ID ||| DPAD DOWN | DPAD UP | DPAD LEFT | DPAD RIGHT |

MDT_EVENT for other cursor driving devices that support relative coordinates and multi-touch.
("mdt_cursor_event_t" when it contains "mdt_game_XYZRx_t gameXYZRx")

| REG | Name | 7 | 6 | 5 | 4 | 3 | 2 | 1 | 0 |
|---|---|---|---|---|---|---|---|---|---|
| 0x00 | MDT_HEADER LEFT MOD. KEYS | isHID | isPortB | isKey-board = 0 | isNotLast = X | isNot Mouse = 1 | contactID | | isTouched |
| 0x01: 0x02 | XY_WORDLEN [0][0:1] | | | X_ABSOLUTE_COORDINATE | | | | | |
| 0x03: 0x04 | XY_WORDLEN [1][0:1] | | | Y_ABSOLUTE_COORDINATE | | | | | |
| 0x05 | VENDOR_SPECIFIC | | | CAN BE USED FOR 7 bit Z_ABSOLUTE_COORDINATE | | | | | |
| 0x06 | VENDOR_SPECIFIC | isGAME = 1 | RSVD | CAN BE USED FOR 7 bit Z_ABSOLUTE_COORDINATE | | | | | |

FIG. 5G

600
PACKET structure summary

```
#define MHL_MAX_DATABYTES    16
#define MHL_ADOPTER_ID        2
define MAX_PAYLOAD           MHL_MAX_DATABYTES - MHL_ADOPTER_ID struct mdt_packet{
    unsigned char         header[MHL_ADOPTER_ID];
    _implemenation_specific    implementation_specific;
};

union_implementation_specific{
    data[MAX_PAYLOAD];
    _data_with_exheader    data_with_exheader;
    _data_with_checksum    data_with_checksum;
    _data_with_exh_n_chksum  data_with_exheader_chcksm;
};

union_implementation_exheader{
    unsigned char         exheader_byte;
    _exheader_with_mdt    exheader_byte_with_mdt;
    _exheader_with_mdt_n_chksm  exheader_byte_with_mdt_chksm;
    _exheader_with_mdt_chksm_len  exheader_byte_with_mdt_chksm;
}
```

```
struct _data_with_exheader {
    _implementation_exheader    optional_header;
    unsigned char               data [13] ;
};

struct _data_with_checksum {
    unsigned char               data [13] ;
    unsigned char               checksum;
};

struct _data_with_exh_n_chksum {
    _implementation_exheader    optional_header;
    unsigned char               data [12] ;
    unsigned char               checksum;
};

struct _exheader_with_mdt{
    unsigned char               mdt:1;
};
struct _exheader_with_mdt_chksm{
    unsigned char               mdt:1;
    unsigned char               chksm:1;
};
struct _exheader_with_mdt_chksm_len{
    unsigned char               mdt:1;
    unsigned char               chksm:1;
    unsigned char               len:4;
}
```

FIG. 6

USB HID Standard Payload

```
#define MODIFIER_KEY_LEFT_CTRL      0x01
#define MODIFIER_KEY_LEFT_SHIFT     0x02
#define MODIFIER_KEY_LEFT_ALT       0x04
#define MODIFIER_KEY_LEFT_GUI       0x08
#define MODIFIER_KEY_RIGHT_CTRL     0x10
#define MODIFIER_KEY_RIGHT_SHIFT    0x20
#define MODIFIER_KEY_RIGHT_ALT      0x40
#define MODIFIER_KEY_RIGHT_GUI      0x80
```

```
struct usb_hid_keyboard_event {
    unsigned char   modifier_keys :8;     //7 bytes
//USB HID header precedes this structure
//keyboard payload has a static 7, byte length
    unsigned char   reserved;
    unsigned char   keycodes[6];
};
```

```
#define MODIFIER_KEY_LEFT_CTRL      0x01
#define MODIFIER_KEY_RIGHT_CTRL     0x01
#define MODIFIER_KEY_LEFT_SHIFT     0x02
#define MODIFIER_KEY_RIGHT_SHIFT    0x02
#define MODIFIER_KEY_LEFT_ALT       0x04
#define MODIFIER_KEY_RIGHT_ALT      0x04
```

```
struct mdt_keyboard_event_t {          //4 or 7 bytes
    unsigned char   modifier_keys :3;
    unsigned char   reserved      :1;  //set to 0
    struct mdt_event_header_t     header;
    union {
        struct {
            unsigned char   keycodesMin[3];
            unsigned char   reserved [3];
        } truncated;
        unsigned char   keycodesMax[6];
    };
};
```

Media Data Tunnel Payload Structure

```
union mdt_event {//4 or 7 bytes each
    mdt_cursor_event_t     cursor_event;
    mdt_keyboard_event_t   keyboard_event;
};
struct mdt_burst_01_t{// 6, 9, 13, or 16 bytes
    unsigned char    ADOPTER_ID[2];
    mdt_event        events[2];
};
```

FIG. 7A

Media Data Tunnel Payload Structure

```c
struct mdt_touch_bits_t{
    unsigned char    isTouched :1;
    unsigned char    contactID :2;
} struct mdt_mouse_XYZ_t {
    unsigned char    xyz_byteLen[3];
    unsigned char    reserved:24;
};

struct mdt_mouse_XYZ_VS_t {
    unsigned char    xyz_byteLen[3];
    unsigned char    vendor_specific:22;
};

struct mdt_touch_XYZ_t {
    unsigned char    xy_wrodLen=[2][2];
    unsigned char    vendor_specific:14;
};

struct mdt_game_XYZRz_t{
    unsigned char    xyzRz_byteLen[4];
    unsigned char    buttons_ex;
    unsigned char    dPad:4;
    unsigned char    deviceID:2;
};

struct mdt_cursor_event_t    {           // 4 bytes or 7 bytes
    union {
        struct mdt_touch_bits_t touchBits;//(isNotMouse==1)
        unsigned char         button:3;//(isNotMouse==0)
    }
    unsigned char                isNotMouse:1;
    struct mdt_event_header_t    header;
    union {
        mdt_mouse_XYZ_t          mouseXYZ;  //(!isNotLast)
        struct {                             //(isNotLast)
            union{
                mdt_mouse_XYZ_VS_t   mouseXYZ;//(!isNotMouse) && (!IsGame)
                mdt_touch_XYZ_t      touchXYZ;//(IsNotMouse) && (!IsGame)
                mdt_game_XYZRz_t     gameXYZRz;//(IsNotMouse) && (IsGame)
            };
            unsigned char        reserved:1;
            unsigned char        isGame:1;
        }
    };
};

union mdt_event {//4 or 7 bytes each
    mdt_cursor_event_t    cursor_event;
    mdt_keyboard_event_t  keyboard_event;
};

struct mdt_burst_01_t{// 6, 9, 13, or 16 bytes
    unsigned char    ADOPTER_ID[2];
    mdt_event        events[2];
};
```

FIG. 7B

USB HID Standard Payload

```
struct usb_hid_mouse_event { //n bytes
    unsigned char buttons:3;              //like mdt_cusor_event_t
    unsigned char device_specific:5; //header is outside payload
    unsigned char x_displacement;    // like mdt_mouse_XYZ_t
    unsigned char y_displacement;
    unsinged char devices_specificy_bytes[];
};
```

FIG. 7C

| ANDROID UI / Linux X11 | |
|---|---|
| EVDEV - Event Consumer<br>redirects kernel events to use space<br>examples: /dev/input/event0 | |
| INPUT<br>HID EVENT GENERATOR<br>Examples: input_report_key(dev, BTN_MIDDLE, value);<br>input.c input.h | |
| USB Driver<br>protocol / device specific support<br>examples: parse mouse info<br>hid-core.c, usbmouse.c, usbkbd.c | MDT HID Driver<br><br>Examples: mouse event<br>CDBevents.c |
| USB HID<br>class specific support<br>other examples: mass storage<br>usbhid.c | HID/MDT Decoder<br>Examples: retrieve SCRATCHPAD<br>data per MDT<br>sii9234_driver.c |
| USB CORE<br>generic USB support<br>Examples : HUBs, descriptors<br>usbcore.c | Sil9234 Driver<br>MHL Tx Manager + MDT Decoder<br>Examples: WRITE_BURST<br>sii9234.c, sii9234_driver.c |
| OHCI / EHCI<br>host hardware specific code<br>example: initialization, ISR<br>ohci-hcd.c or echi-hdc.c | SMBUS or 12C Driver |

FIG. 8

HDMI to MHL dongle
for
HDMI Enabled Display and
MHL Enabled Device

TRANSMISSION OF MULTIPLE PROTOCOL DATA ELEMENTS VIA AN INTERFACE UTILIZING A DATA TUNNEL

TECHNICAL FIELD

Embodiments of the invention generally relate to the field of data communication, and, more particularly, to transmission of multiple protocol data elements via an interface utilizing a data tunnel.

BACKGROUND

In certain devices, a connector or other physical interface may be utilized to transport more than one kind of data. For example, the MHL™ (Mobile High-definition Link) specification allows for a connector to be utilized for transmission of both MHL data and USB™ (Universal Serial Bus) data, where USB data may be transmitted when the connector is not being utilized for the transmission of MHL data.

However, such use may be limited to only one of such protocols at any time. For example, if the protocols both utilize all or most of the bandwidth of the connector or other physical interface, then there is not sufficient bandwidth to accommodate the data for both of the protocols simultaneously.

BRIEF DESCRIPTION OF THE DRAWINGS

Embodiments of the invention are illustrated by way of example, and not by way of limitation, in the figures of the accompanying drawings in which like reference numerals refer to similar elements.

FIGS. 4A and 4B illustrate embodiments of message structures for communications utilizing a Media Data Tunnel;

FIGS. 5A, 5B, 5C, 5D, 5E, 5F, and 5G illustrate data packets utilized in conjunction with embodiments of an apparatus or system including a Media Data Tunnel;

FIG. 6 illustrates an embodiment of a packet structure for an extended header in a Media Data Tunnel implementation;

FIGS. 7A, 7B, and 7C illustrate payload structures for an embodiment of a Media Data Tunnel encoder in comparison to standard HID structures;

FIG. 8 illustrates layers for an embodiment of a Media Data Tunnel;

SUMMARY

Figure 1:
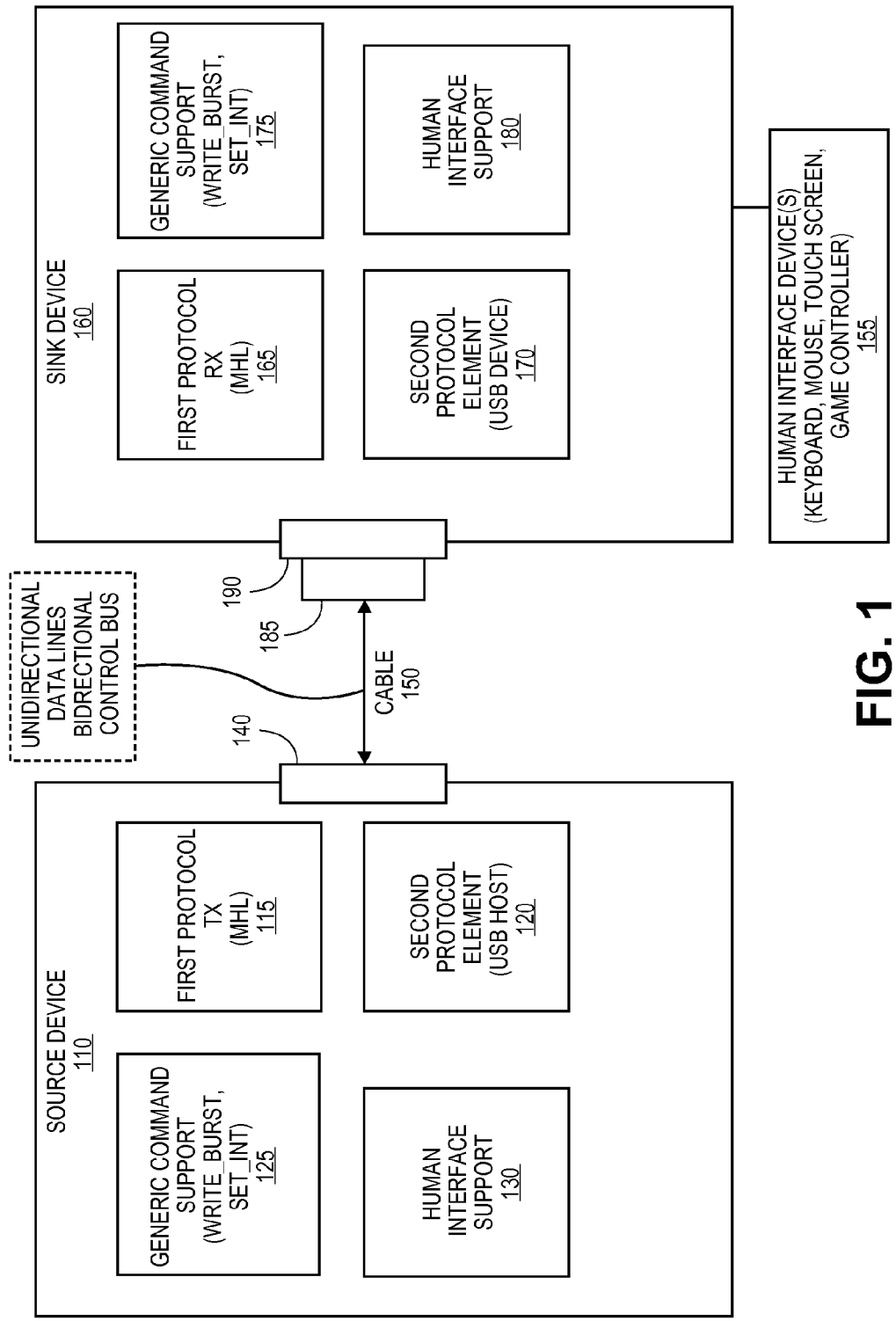
FIG. 1 is an illustration of an embodiment of an apparatus and system to provide data tunneling transmission of multiple protocol data elements via a connector utilizing a data tunnel.

Embodiments of the invention are generally directed to transmission of multiple protocol data elements via an interface utilizing a data tunnel.

In a first aspect of the invention, an embodiment of an apparatus includes a transmitter or receiver for the transmission or reception of data; a processing element for handling the data of the apparatus; and a connector for the transfer of the data, the connector to connect to a data channel and to connect to a control channel. The processing element is to provide for transfer of data of a first protocol in the control channel, the transfer of data via the control channel including the use of one or more generic commands of the first protocol for the transfer of data of a second protocol. The data of the second protocol is optimized before it is sent over the first protocol, and the data transfer in the data channel and data transfer in the control channel are simultaneous at least in part.

In a second aspect of the invention, an embodiment of a method includes, at a first apparatus, transferring a first set of data to or from a second apparatus, the first set of data being in a first protocol, where transferring the first set of data includes transmitting or receiving data over a data channel for the first protocol via a connector; applying optimization to data of the second protocol before it is sent over the first protocol; and, at the first apparatus, transferring a second set of data to or from the second apparatus, the second set of data being in the second protocol, where transferring the second set of data includes transmitting or receiving data over a control channel for the first protocol via the connector, where the first set of data and the second set of data are transferred simultaneously at least in part, and the second set of data is transferred using one or more generic commands of the first protocol.

DETAILED DESCRIPTION

Embodiments of the invention are generally directed to transmission of multiple protocol data elements via an interface utilizing a data tunnel.

As used herein:

"Mobile device" means a telephone (such as a smartphone), laptop computer, handheld computer, tablet computer, mobile Internet device (MID), or other mobile electronic device.

"Processing element" means any electronic component, module, or other unit that provides for the processing of data, including, but not limited to, a general purpose or special purpose processor, a central processing unit (CPU), an embedded processor, or a video processor. A processing element may be an electronic component, module, or other unit that provides functions in addition to the processing of data.

Certain interfaces may allow data of different protocols to be transferred via a connector or other physical interface. In an example, the MHL specification allows the use of a five-pin connector to relay audio/video (A/V) data (MHL data) and, when the connector is not used for MHL, the connection may be used to support USB (Universal Serial Bus) data. However, the MHL specification does not provide support for the five-pin connector to carry both A/V and USB data simultaneously. The MHL specification further defines a process for transferring generic data over the MHL CBUS (Control bus) using certain commands, the commands being WRITE_BURST and SET_INT commands. This definition for the transfer of data in MHL is generic, without any identified use cases. While the description here generally refers to MHL and USB as an example, embodiments are not limited to these particular protocols. As used herein, a generic command is a command that does not limit the particular form of data that is transmitted, and thus may be used for multiple different kinds of data transfers.

In some embodiments, an apparatus, system, or method provides for the use of an interface to carry data using multiple different protocols simultaneously at least in part through the use of a data tunnel. In an a particular implementation, an apparatus, system, or method applies MHL generic WRITE_BURST and SET_INT commands to simultaneously support a first protocol (such as A/V MHL data) and certain second protocol data (such as USB), where the second protocol data may be limited to certain data elements. For example, the second protocol data may be low speed USB Human Interface Device (HID) data, such as game control data, cursor data (such as mouse data and touchpad or touchscreen data), and keyboard data, over the MHL connection. However, embodiments are not limited to operations in which protocol data is restricted to certain data elements. In some embodiments, the multiple protocol capability is made available by creating a data tunnel or bridge between a mobile device and a remote data connector, where the data tunnel is referred to as a Media Data Tunnel (MDT). In some embodiments, the remote data connector is physically located in a MHL enabled display, or in an HDMI™ (High-Definition Multimedia Interface) to MHL dongle, while a local data connector may be located in a mobile device.

In some embodiments, in addition to the Media Data Tunnel extending operation under a protocol, such as the MHL specification, an apparatus may tunnel a mobile device to any low speed data connector within an MHL enabled display or an HDMI to MHL dongle. In an example, serial communication for terminal access may be carried over the Media Data Tunnel.

In some embodiments, an apparatus, system, or method provides an implementation guide that ensures a generic write command, such as MHL WRITE_BURST, provides sufficient bandwidth and appropriately low latency for HID and equivalent low speed applications. A command such as WRITE_BURST may be utilized to relay data at a slower speed than the data transmission speed. However, the performance may not suffice for HID and equivalent applications. In some embodiments, the Media Data Tunnel is utilized to provide sufficient performance for real world use cases, reducing WRITE_BURST limitations to offer sufficient performance for HID and other applications.

In some embodiments, an apparatus, system, or method enables a protocol, such as MHL, to be a multi-purpose bus. By design, MHL is intended to support audio/video (A/V) in a mobile environment. In some embodiments, an apparatus, system, or method extends capability to also support human input and peripheral-enabling data transfer. In some embodiments, capability is expanding by allowing MHL to simultaneously carry MHL and low speed USB data. However, embodiments are not limited to any particular protocol. For example, because a generic mechanism is used to support additional data transfer, first protocol data may be paired with data from any low speed bus.

The MHL specification limits data tunneling of other protocol through implementation requirements and timeouts. The specification imposes a 10 ms timeout for receipt of a GRT_WRT message. Should a MHL device consume the majority of the allowed timeout period, the MHL device would throttle tunneling using MHL's WRITE_BURST commands to under 100 events/second. The MHL specification also defines a three-stage coordination process for WRITE_BURST commands that similarly reduces bandwidth. Media Data Tunnel offers an interoperable solution to the limitations in the MHL specification through additional guidelines for discovery and coordination that meet the MHL specification while improving WRITE_BURST supported bandwidth.

It may not be possible or practical to provide a full feature set of both a first protocol and a second protocol, such as USB and MHL, over the same connector. The MHL specification doesn't explicitly offer any means to support USB data. In some embodiments, an apparatus, system, or method allows for transmission of multiple protocol data types when the protocols each normally use the full bandwidth or a large amount of the bandwidth of a port. For example, while MHL allows the use of a single five-pin connector for A/V or USB peripherals, the port function is limited to offer A/V and USB services mutually exclusively at any time. While MHL combines A/V and USB ports into a single 5-pin connector, the port cannot conventionally serve MHL and USB services simultaneously because the USB and MHL specifications each allocate the full bandwidth of the same differential pair for independent purposes of one another and thus MHL and USB would conflict if used in parallel.

In some embodiments, a connector may simultaneously serve A/V and low-speed USB peripherals even though the connector lacks the bandwidth to support, for example, a USB enabled link to a PC. In some embodiments, second protocol peripheral data, such as USB peripheral data, may be transmitted over a control channel comprising a first protocol control bus using first protocol compliant commands. In an example, use of MHL compliant commands ensures that USB data doesn't interfere with MHL data on the CBUS. Furthermore, encoding of USB data on the CBUS leaves the differential pair for transport of A/V data, in compliance with the MHL specification. Because the one-wire control bus generally offers a fraction of the bandwidth available by a differential pair, an apparatus or system may be limited to low speed data, such as low-speed USB data, where the Media Data Tunnel may not be fast enough to support a USB enabled link between a mobile device and a computer.

In a conventional device, the five-pin USB port on a mobile device primarily serves to link the device to a PC, a mode in which the port wouldn't be required to offer A/V services. For example, the MHL specification wasn't defined to simultaneously offer USB data and A/V services. Instead, MHL includes WRITE_BURST and SET_INT commands, which are defined in the MHL specification for general data use, which such commands may, for example, be used to provide firmware upgrade or to infrequently relay small chunks of proprietary data.

However, with advent of new mobile operations smart phones are being considered as mobile computers that can drive a desktop display and simultaneously receive game controller, cursor (mouse, touchpad, or touchscreen), or keyboard input. In some embodiments, a mobile device is used to provide A/V and USB services in parallel for such operations through independent connectors and cables.

In some embodiments, a Media Data Tunnel includes an application of commands such as MHL WRITE_BURST and SET_INT commands that allow use of MHL as a multi-purpose bus between a MHL transmitter and receiver. In some embodiments, the Media Data Tunnel offers a two-layer tunnel that takes advantage of MHL's Link Control Bus link and translation layers. Through the use of these layers, the Media Data Tunnel benefits from MHL's flow control at link and translation layers. Similarly, the Media Data Tunnel may benefit from MHL's error detection at link and translation layers. In some embodiments, an implementation of a Media Data Tunnel may optionally extend MHL features. In some embodiments, implementation flow control, error detection, and additional retries depend on performance or feature expectations created by the tunneled bus. In some embodiments, optimization is applied to USB data before the optimized data is transferred in MHL protocol. As used herein, optimized data refers to data that has been subjected to an optimization or adaptation process, and does not imply that such data represents an optimal data form or solution.

FIG. 1 is an illustration of an embodiment of an apparatus and system to provide data tunneling transmission of multiple protocol data elements via a connector utilizing a data tunnel. In this illustration, a source device 110 (such as a mobile device or other apparatus) is coupled with a sink device 160 (such as a television or other video system, a computer, a game console, MHL dongle, or other apparatus). The source device 110 and sink device 160 may be coupled via a cable 150. The cable 150 may include an MHL compatible cable having a data channel comprising a unidirectional differential pair for data transmission and a control channel comprising a bidirectional (single line) control bus (CBUS). One or more human interface devices are coupled with the sink device 160.

The source device 110 may include a connector 140 for connection of the cable 150, such as a USB receptacle compatible with MHL. The sink device may include a connector 190 for connection of the cable, where the connector may alternatively be a USB connector or may be another receptacle (such as an HDMI receptacle) to which is coupled a display's SOC or conversion element generally referred to as a dongle (such as an MHL to HDMI dongle).

In some embodiments, the source device 110 and sink device 160 both include elements, including circuitry, for a second protocol, where the second protocol may be USB. In this illustration, the source device 110 includes a second protocol element 120, which may operate as a USB host, and the sink device 160 includes a second protocol element 170, which may operate as a USB device.

In some embodiments, the source device 110 and sink device 160 utilize a Media Data Tunnel to transfer data in the second protocol simultaneously at least in part (at the same time or in an overlapping time period) with data transferred in the first protocol, where optimization or adaptation is applied to the data of the second protocol before being transferred in the first protocol. In some embodiments, the Media Data Tunnel includes use of the control bus of the cable 150 for the transfer of bidirectional data, such as USB data. In some embodiments, an identification field of the first protocol utilizes an optimum or minimal amount of data to identify recipients via the control bus. For example, the identification field of the first protocol has a size that is equal to two bytes of data.

In some embodiments, the sink device 160 and the source device 110 use control bus commands of the first protocol to transfer data of the second protocol, which the data of the second protocol may be a subset of the full data set of the second protocol. For example, a subset of the data of the second protocol may include human interface device data. In this illustration, one or more human interface devices 155 may be coupled with the sink device 160. The one or more human interface devices 155 may include a keyboard, a mouse, a touch pad or touch screen, a game controller, or other device by which an intention of a user may be input. Support for a human interface device is illustrated as human interface support 130 for the source device 110 and human interface support 180 for the sink device 160.

In some embodiments, one or more messages of the second protocol may be sent in a single burst of data transmission of the first protocol. In some embodiments, each data burst is coordinated through interrupt messages. In some embodiments, some portion of the interrupt messages are aggregated and transferred in a single message.

In some embodiments, the Media Data Tunnel includes transmission of data in the second protocol via certain generic commands of the first protocol, which may include generic commands of MHL. In this illustration, the source device 110 and sink device 160 are illustrated as include generic command support, shown as generic command support 125 of the source device and generic command support 175 of the sink device, where such support may include support for MHL, which includes support of commands WRITE_BURST and SET_INT.

In some embodiments, the sink device 160 may receive HID command data from a human interface device, such as, for example, data describing a keyboard keystroke, game controller input or movement, or cursor (mouse, touchpad, or touch screen) movement. In some embodiments, the sink device 160 and source device 110 may utilize one or more generic commands for the transmission of such HID data, where the transmission of such data may be accomplished utilizing the bidirectional control bus provided by the cable 150 between the source device 110 and the sink device 160. USB is bidirectional and when a device uses a receptacle such as a USB micro AB receptacle, the USB port may act like a USB host or a USB device. In this illustration, for purposes of the Media Data Tunnel the source device 110 may act primarily as a WRITE_BURST receiver and the A/V source device, with coupled human interface devices, may act primarily as a WRITE_BURST sender for the transmission of HID data, but embodiments are not limited to this, and the roles of the device may be reversed.

Figure 2:
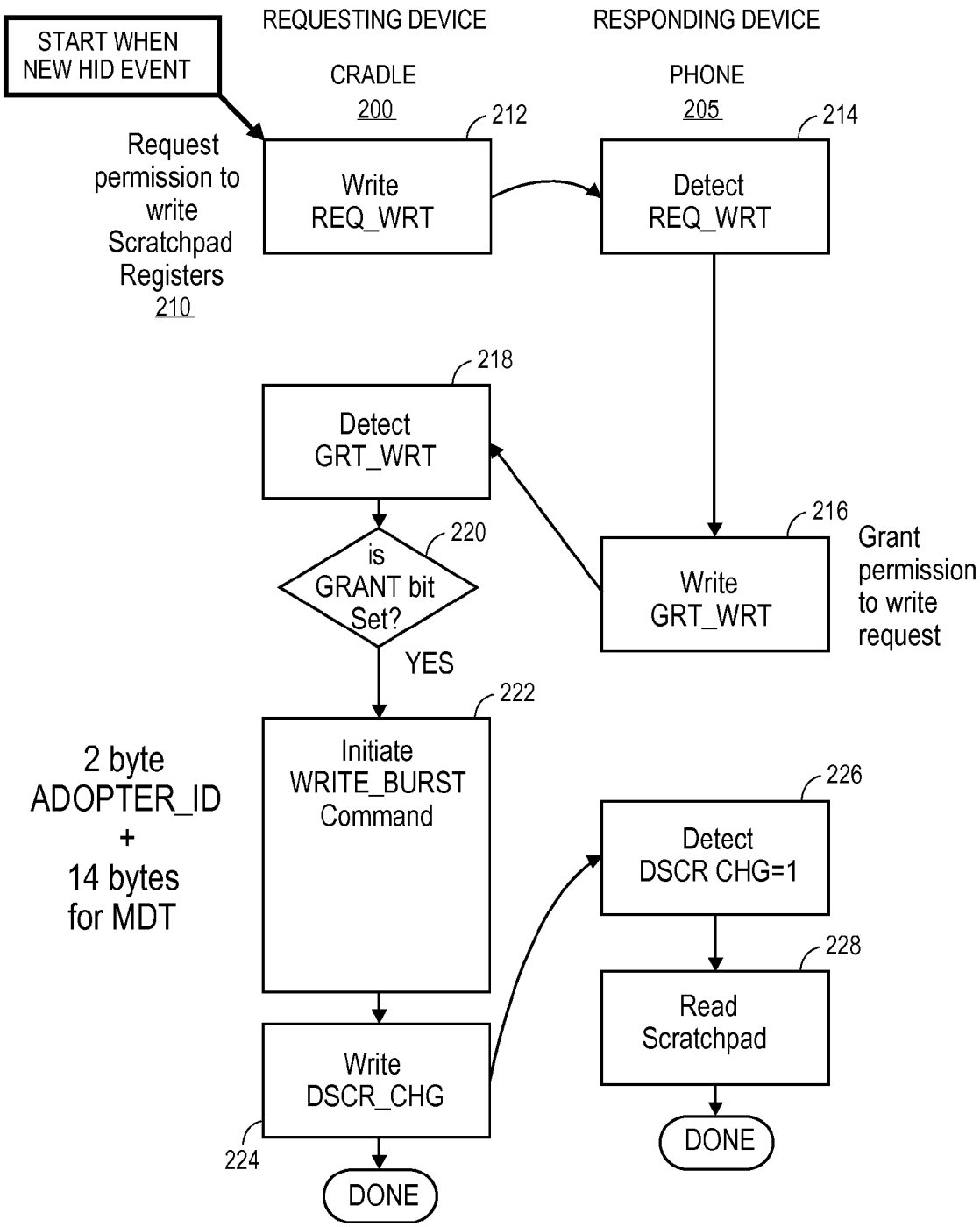
FIG. 2 illustrates an embodiment of a method for transmission of data using commands without use of a Media Data Tunnel.

FIG. 2 illustrates an embodiment of a method for transmission of data using commands, such as MHL WRITE_BURST commands, without use of a Media Data Tunnel. In this illustration, a requesting device 200, such as a cradle for connection with a mobile device, is coupled with a responding device 205, such as a mobile phone. In some embodiments, when a new HID event occurs, the requesting device 200 provides relays SET_INT command with REQ_WRT bit set 212 to request permission to write the scratchpad registers 210 of a responding device 205, such as a mobile phone. The responding device 205 detects the REQ_WRT bit 214, and grants permission to the write request, with a SET_INT command containing a GRT_WRT bit 216 to the requesting device. The requesting device 200 detects the GRT_WRT bit 218. If the grant bit is set 220, then there is an initiation of the WRITE_BURST command 222 and writing of a SET_INT command with a DSCR_CHG bit 224 by the requesting device 200. The responding device 205 detects that DSCR_CHG=1 226 and operates to read its local scratchpad registers 228.

Figure 3:
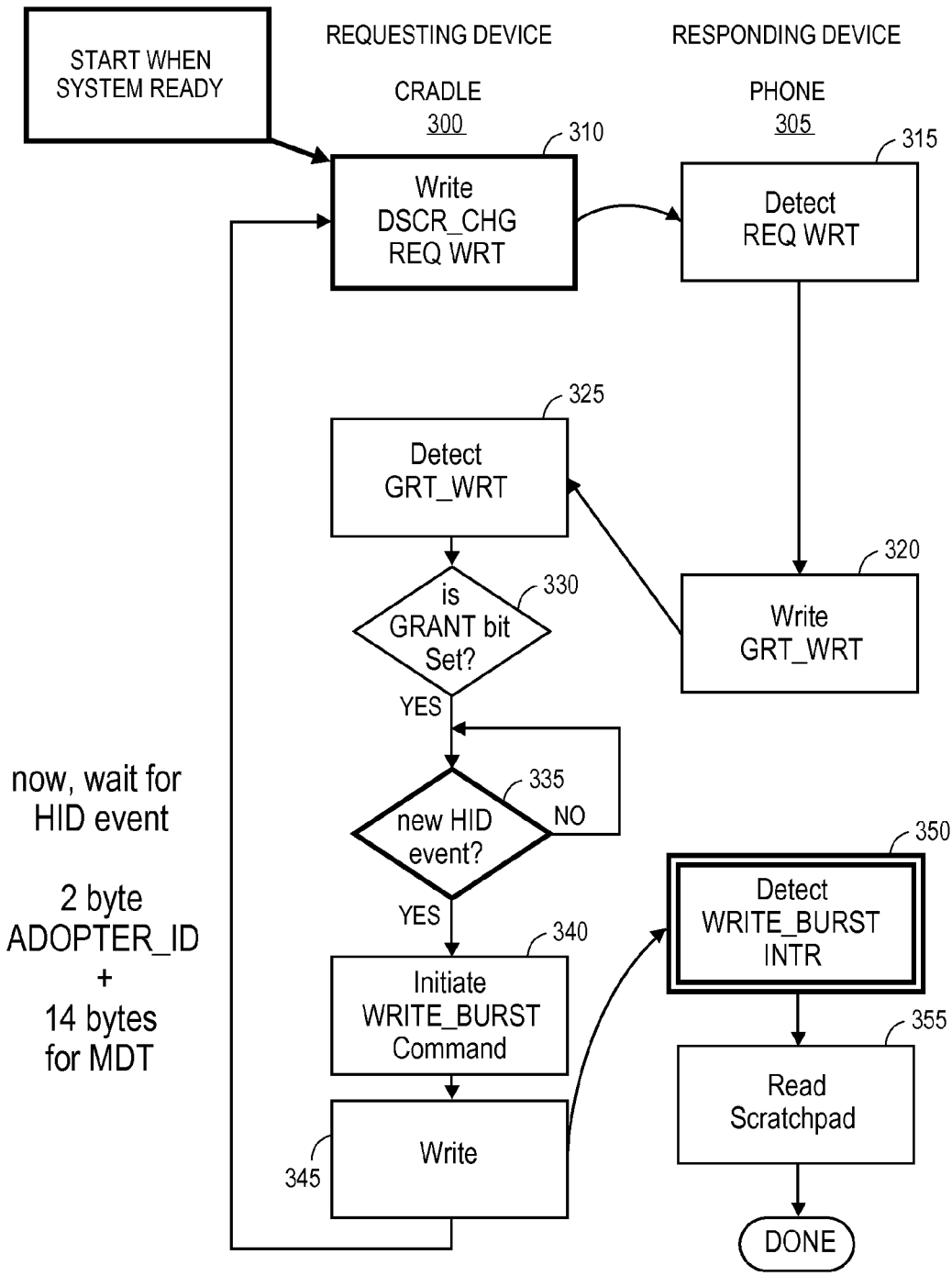
FIG. 3 illustrates an embodiment of a method for transmission of data using a Media Data Tunnel.

FIG. 3 illustrates an embodiment of a method for transmission of data using a Media Data Tunnel, such as using MHL WRITE_BURST commands. In this illustration, a requesting device 300, such as a cradle for connection with a mobile device, is again coupled with a responding device 305, such as a mobile phone. In some embodiments, when the system is ready, the requesting device 305 writes a SET_INT command with DSCR_CHG and REQ_WRT 310 bits set. The responding device 305 detects the REQT_WRT 315 bit, and responds with a SET_INT command with a GRT_WRT bit 320. The requesting device 300 detects the GRT_WRT bit 325. If the grant bit is set 330, the sender attained access to the receivers scratchpad register and may wait for a new HID event 335. Upon a new HID event 335, there is an initiation of a WRITE_BURST command 340 and a write operation 345 by the requesting device 300, which returns to writing DSCR_WRT REQ_WRT 310. In some embodiments, the responding device detects the WRITE_BURST 350 and reads the scratchpad 355. In some embodiments, the responding device waits for the following SET_INT command with DSCR_CHG and REQ_WRT bits set before it retrieves data from its local scratchpad.

In some embodiments, at each end of a CBUS data tunnel, a processing element, which is otherwise responsible for monitoring and control of the MHL transmitter or receiver, implements Media Data Tunnel encoder and decoder logic. In operation, an MHL transmitter or receiver is serviced by a processing element, such as a micro-controller or a system on chip (SoC). A driver executed by a processing element administers service logic. Per the MHL specification, an MHL transmitter may reside in a source apparatus or system, such as a phone, tablet, or other mobile device. The MHL receiver may reside in a sink apparatus or system, such as a docking station, a monitor, or a TV display. The MHL receiver may also reside in a MHL to HDMI dongle. In some embodiments, an MHL transmitter or receiver driver is extended directly or through an additional software layer to offer Media Data Tunnel encoding and decoding support, such as a part of a bridging process described below.

Stage 1:

Discovery and Establishment of Tunnel. In operation, in a first stage, an MHL transmitter and receiver establish a tunnel link through MHL specified discovery. The MHL transmitter and receiver establish a CBUS data tunnel by complying with MHL's data exchange stage of the MHL specified discovery sequence. As part of the data exchange, the transmitter and receiver exchange device capability registers. This exchange is initiated by each side relaying an asserted DCAP_RDY bit through transmission of a WRITE_STAT command. The exchange follows with each side optionally and independently transmitting the DCAP_CHG bit using the SET_INT command. In response, the WRITE_STAT and SET_INT recipient retrieves the SET_INT sender's capabilities using a sequence of READ_DEVCAP commands. From the received data, each side identifies SP_SUPPORT, SCRATCHPAD_SIZE, and ADOPTER_ID of its MHL peer. In some embodiments, SP_SUPPORT informs the Media Data Tunnel participant of its peer's ability to support WRITE_BURST. SCRATCHPAD_SIZE allows the Media Data Tunnel participant to assess buffering support in its peer. The ADOPTER_ID is cached and reused by the MDT participant as the MDT packet header for all subsequent WRITE_BURST commands.

In some embodiments, a Media Data Tunnel extends discovery to include exchange of information regarding Media Data Tunnel capabilities pertaining to packet structure and service performance. Prior to commencing payload exchange through the Media Data Tunnel, the Media Data Tunnel transmitter identifies the header data or complete packet structure used in future WRITE_BURST packets. In some embodiments, it is the responsibility of the Media Data Tunnel receiver to accept the terms of the transmitters and relay any constraints also using the standard WRITE_BURST mechanism. Alternatively, the recipient may reject the proposed packet structure by allowing the transmitter to timeout. Further, in response to a Media Data Tunnel recipient's constraints, the Media Data Tunnel transmitter may proceed with Media Data Tunnel transmission or disqualify the Media Data Tunnel recipient based on its restrictions and return an error to the user.

In some embodiments, the WRITE_BURST command used during extended discovery adheres to the MHL specification without elements described below as part of Media Data Tunnel encoding.

In some embodiments, for any Media Data Tunnel implementation with a need for deterministic performance, the Media Data Tunnel recipient relays its performance constraint during extended discovery. The performance of MHL's WRITE_BURST mechanism is deterministic, but may be unrealistic in certain requirements. The MHL specification requires a WRITE_BURST recipient to relay a GRT_WRT within 10 ms of receipt of a REQ_WRT. The specification also mandates that a packet be sent within 100 ms of a prior packet. In concert, the two timeouts make an allowance of two seconds for the completion of a 16-byte WRITE_BURST. While these constraints offer guidance for worst case performance and make MHL's WRITE_BURST deterministic, the allowed delays reduce data rates below most applications and mandate further qualification during Media Data Tunnel's discovery.

In an implementation used to relay HID cursor, game controller, and keyboard event data using mdt_burst_t packet structure, defined below, the transmitter informs the recipient of the chosen data format. In some embodiments, because the MHL specification doesn't mandate a timely relay of DCAP_RDY or DCAP_CHG, for timely discovery all Media Data Tunnel participants relay DCAP_RDY using the WRITE_STATE command within 10 seconds of sending PATH_EN. In addition, Media Data Tunnel participants retrieve Device Capability register information from its peer within at least 20 seconds of sending PATH_EN or whatever shorter interval is mandated by the MHL specification. Subsequent to this exchange and prior to transmission of HID data, the Media Data Tunnel transmitter sends a WRITE_BURST with a 13-byte payload of 'MDTREQxy_FULL'. When x and y elements of this string equal to a 2-byte ASCII array of '01', the string represents a token. This token informs the Media Data Tunnel receiver that WRITE_BURST data will adhere to mdt_burst__01_t structure, defined below.

If the Media Data Tunnel recipient is prepared to receive packets identified by 'MDTREQxy_FULL', the recipient responds with a WRITE_BURST containing 'MDTACK_abcd'. 'MDTACK_' characters serve as a token. This token signals readiness for receipt of HID data. The 'abcd' characters serve as placeholders. The placeholders contain ASCII characters that represent four nibbles in hex notation. These four characters reflect the maximum time, in microseconds, that a recipient needs to receive the event: respond to a REQ_WRT, handle a DSCR_CHG interrupt, and read out its scratchpad. However, if the recipient cannot service packets identified by 'MDTREQxy_FULL', the recipient allows the sender to timeout by avoiding WRITE_BURST transmission to the Media Data Tunnel transmitter for 40 milliseconds, few milliseconds more than the minimum time for a Media Data Tunnel transmitter to attempt 3 retries.

In some embodiments, for HID applications, a Media Data Tunnel receiver may be required handle a received WRITE_BURST within a time period, such as 10 ms. At a minimum, USB enabled HID devices adhere to the low speed criteria of the USB specification. According to this criterion, the minimum interval between two event reports equals or exceeds 10 milliseconds. In order for the Media Data Tunnel to keep up with the quickest of USB low speed, HID devices, the Media Data Tunnel recipient responds to 'MDTREQxy_FULL' with 'MDTACK__2710' or 'MDTACK_abcd' in which abcd is a combination of ASCII characters reflecting a HEX value between 0 and 0x2710 (10,000 microseconds). In case the Media Data Tunnel transmitter doesn't receive a WRITE_BURST with the expected payload, it may notify the user and reject future requests for equivalent Media Data Tunnel service.

FIGS. 4A and 4B illustrates embodiments of message structures for communications utilizing a Media Data Tunnel. In this illustration, software provided in C syntax illustrates packet structures for HID events, including cursor events, game controller events and keyboard events.

FIGS. 5A, 5B, 5C, 5D, 5E, 5F, and 5G illustrate data packets utilized in conjunction with embodiments of an apparatus or system including a Media Data Tunnel. In this illustration, the tables provide a register-formatted view of a Media Data Tunnel data packet. In some embodiments, the data packet may include MDT events for keyboards, mice, game controllers, and other cursor driving devices.

The format for the following are illustrated in FIGS. 5A through 5G:

FIG. 5A illustrates the format for MDT_BURST packet 505.

FIG. 5B illustrates the format for MDT_EVENT for keyboards with truncated, trailing 0's in series 510

FIG. 5C illustrates the format for MDT_EVENT for keyboards with more than three key codes, or that are packaged into a WRITE_BURST with a second event 515.

FIG. 5D illustrates the format for MDT_EVENT for mice that adhere to boot protocol or support a 4-bit HID event and use relative coordinates 520.

FIG. 5E illustrates the format for MDT_EVENT for mice that require vendor specific function or are packaged into a WRITE_BURST with a second event 555.

FIG. 5F illustrates the format for MDT_EVENT for game controllers 560.

FIG. 5G illustrates the format for MDT_EVENT for other cursor driving devices that support relative coordinates and multi-touch 565.

In some embodiments, the Media Data Tunnel transmitter may also send 'MDTREQxy_CURSOR' or 'MDTREQxy_KEYS' instead of 'MDTREQxy_FULL' to signal that its future WRITE_BURSTs are limited to only events from a single cursor driving device or only keyboard events. If the Media Data Tunnel transmitter sends 'MDTREQxy_CURSOR' in a WRITE_BURST, the Media Data Tunnel recipient may expect WRITE_BURST payloads with mdt_event content limited to mdt_cursor_event_t structure. If the Media Data Tunnel transmitter sends 'MDTREQxy_KEYS' in a WRITE_BURST, the Media Data Tunnel recipient may expect WRITE_BURST payloads with the mdt_event content limited to mdt_keyboard_event_t structure.

In some embodiments, in order to support game controllers, the MDT transmitter should send "MDTREQxy_FULL". A common game controller consists of various physical interfaces: a directional pad, two analog sticks, and 4 or more buttons. While the mapping between such physical inputs and MDT events is likely to be controller specific, controllers commonly relay user input by mapping a game controller to mice and keyboard events. The directional pad is to generate up, down, left, and right key, MDT keyboard events as though the events were coming from a keyboard.

In a game controller implementation, cursor events with is MouseNot set to 0 carry data from analog sticks while using is PortB field inside mdt_event_header_t is used to distinguish the left stick from the right. Lastly, buttons are encoded into the buttons field within cursor events and keys, but are only sent using one mechanism for every button toggle. Further, all buttons toggles may be mapped to key toggles per USB HUT 1.12 and Linux input.h. Specifically, Linux's input.h provides for 10 buttons with key codes in the range between 0x100 and 0x109 such that 0x100 relays a BTN__0 event and 0x109 relays a BTN__9 event. In parallel, the first three buttons map to the three bits in cursor events sent with is PortB field set to 0, and the second three buttons map to the three bits in the cursor events sent with is PortB field set to 1. In some embodiments, the parallel mapping at the transmitter and receiver may allow the transmitter the flexibility of pairing button events with an event from a directional pad or analog stick, ensure the receiver properly decodes the event, and allow reduced, average event latency for the system.

Since UI systems typically do not differentiate between physical HID devices and aggregate all events of a particular type into the same queue, Media Data Tunnel doesn't guarantee HID device identification unless the device data is relayed using the game controller packet structure. In case a single peripheral contains multiple logical mice interfaces assigned the same is PortB field value, the Media Data Tunnel receiver would attribute all events to the source identified by the is PortB field. Should an application need to distinguish the source, each logical mouse device in the proposed physical peripheral would need to send HID events using the game controller packet structure with is Keyboard=0, is NotMouse=1, is GAME=1, and a unique interface identifying ID in the Device ID field. For keyboard type devices and other unforeseen peripherals that may need to relay ID information, Media Data Tunnel offers reserved (RSVD) fields for definition expansion. The discovery mechanism described here for transmission of HID data over a Media Data Tunnel is not limited to HID data. The mechanism may be used to establish expectations for exchange of RS232, RS485, and other low bandwidth data over Media Data Tunnel. As an example, when Media Data Tunnel carries RS232 data, the initial discovery phase may be used to identify link connection properties: baud rate, use of start bit, number of data bits, use of a parity bit, and number of stop bits.

Stage 2:

Encoding and Decoding Data. In some embodiments, Media Data Tunnel peers encode and decode data for transmission through the Media Data Tunnel. The Media Data Tunnel transmitter encodes data before it writes it to the scratchpad. The encoder adds an optional checksum suffix, adds a header prefix, and breaks up the data into 14-byte packets. On the receiving end, the Media Data Tunnel recipient decodes the data after it is read out of the scratchpad.

The MHL specification limits transmission using the WRITE_BURST command to 16 data bytes per WRITE_BURST command with basic error detection at link and translation layers. Aside from the maximum limit of sixteen data bytes, each WRITE_BURST command is required by the MHL specification to contain a minimum of two data bytes initialized with the recipient's ADOPTER_ID. However, the actual length of the WRITE_BURST is not encoded into the command or carried in the data bytes. Per the MHL specification, the recipient increments a byte counter during a WRITE_BURST reception until it receives an EOF (End Of File) control packet following the last data byte. The recipient starts its counter after it receives a WRITE_BURST command packet and an Offset data packet. Once started, the counter tracks each MHL data packet carrying a WRITE_BURST data byte. Regardless of the packet type, every packet sent across the CBUS offers basic link layer error detection though two Header bits, one Control bit, and one Parity bit. In the case a packet is received with unexpected parity, control, or header data the packet recipient responds with a NACK as part of its MHL link layer logic. The MHL specification also offers error detection at the translation layer for a WRITE_BURST command. The recipient may respond to a WRITE_BURST with an ACK or ABORT control packet to relay the result of its translation layer validations: assessment of the offset value in the Offset data packet, a count of the data bytes received, and verification of the 2-byte ADOPTER_ID.

In some embodiments, because the MHL specification offers basic error detection, Media Data Tunnel specific error detection may be optional through the use of a single byte checksum suffix. For applications requiring enhanced error detection or error correction, the encoder may calculate an appropriate byte checksum over the WRITE_BURST data bytes. In some embodiments, a checksum algorithm may be parity, modular sum, CRC (cyclic redundancy check), or any other algorithm that is used on both sides of the tunnel, as part of the Media Data Tunnel encoder and the Media Data Tunnel decoder. In some embodiments, error handling of errors caught through the optional checksum may be application specific. For example, error handling might consist of correction allowed by the checksum, a retry mechanism enabled by predefined acknowledgement logic, or by simply dropping erroneous data without further consumption. Regardless of the implementation, the Media Data Tunnel transmitter conveys inclusion of a packet checksum suffix and checksum method during Media Data Tunnel discovery.

In some embodiments, for a particular implementation for sending HID data over Media Data Tunnel, a checksum isn't used. HID reports of user input may be seen as a stream. In case of rare errors, the user could easily alter input. In the event a mouse report doesn't reach the Media Data Tunnel receiver, a user is likely to make additional mouse movements to relay intended information. Similarly, the user is likely to repeat a key press not recognized by the system or correct a misinterpreted key press by first deleting the prior entry and then sending a correction.

In some implementations, a media data link encoder is required to add a header, such as a header consisting of two mandatory bytes. The MHL specification requires that the first two bytes following the Offset data packet in a WRITE_BURST convey the recipient's ADOPTER_ID. Since the ADOPTER_ID is allocated by the MHL, LLC. (the entity responsible for administering the MHL Consortium and the adoption, licensing, and promotion of the MHL Specification), it is not possible to use variable values in the first two bytes of a WRITE_BURST. To meet MHL requirements, the sender retrieves the ADOPTER_ID during MHL discovery, previously described, and subsequently uses this value to initialize the first two bytes of the scratchpad.

In some embodiments, to reduce latency, the Media Data Tunnel sender only sets the ADOPTER_ID bytes of the scratchpad once for a series of WRITE_BURSTs. In subsequent transmissions, if the scratchpad wasn't overwritten by an incoming WRITE_BURST, the Media Data Tunnel sender will have two less bytes to write to the scratchpad.

Following the first two bytes, the header may be optionally extended in a way unique to a Media Data Tunnel implementation, as long as the decoder contains the same header definition. If the MHL adopter intends to use WRITE_BURST commands for Media Data Tunnel as well as other purposes, such as firmware upgrade, the header may contain an additional bit to associate a WRITE_BURST with Media Data Tunnel.

In an implementation used to relay HID mouse and keyboard event data using mdt_burst_t, previously defined, the header is mdt_event_header_t, a four-bit structure. In some embodiments, to allow multiplexing of WRITE_BURST for HID and other, undefined Media Data Tunnel applications, the most significant bit (MSb) in the header indicates HID use. Three bits that follow the MSb qualify the data in the payload. The is PortB bit identifies the physical origin of the event, mdt_event_header_t supports up to 2 HID devices identified by a unique port. The is Keyboard bit identifies the content of mdt_event union; if is Keyboard is '1', mdt_event union points to an mdt_keyboard_event_t. However, if is Keyboard is '0', mdt_event union points to an mdt_mouse_event_t. The is NotLast bit allows multiplexing of multiple HID events within a single WRITE_BURST for multitouch and other applications that mandate support for a higher event rate. When is NotLast is set to 0, the bit also identifies latency optimized keyboard and mouse packet structures adapted through translation or optimization. When is NotLast is set to 1, the receiver will examine scratchpad offset 9 byte for presence of a second event within a WRITE_BURST. In case the transmitter doesn't intend to aggregate 2 events within a single WRITE_BURST but, requires the full 7 byte payload instead of using a adapted packet for its primary event, the transmitter sets the MSb at scratchpad offset 9 to 0 to ensure the MDT receiver ignores scratchpad bytes 9 to 16.

While the MHL specification limits transmission using the WRITE_BURST command to sixteen data bytes, the mandatory ADOPTER_ID reduces allowed payload. An encoder for any WRITE_BURST at the transmitter breaks data it is sending into fourteen or fewer data byte payloads.

In some embodiments, in addition to the ADOPTER_ID overhead, the encoder in a Media Data Tunnel transmitter is required to account for the Media Data Tunnel header. Additional header bits or bytes further reduce the size of a possible WRITE_BURST payload. While it is possible to support packets conveyed using multiple WRITE_BURSTs, slow data rate marginalizes this feature in a Media Data Tunnel implementation.

For transmission of HID over media data tunnel, a four-bit header overloads the first nibble of every packet. As shown in the structures above, mouse and keyboard events where modified to allow a four-bit header.

In some embodiments, in addition to transmission of HID over media data tunnel, the following packet structures may be used. As an example, _implementation_specific union uses all fourteen of the remaining data bytes in a WRITE_BURST for data consisting of an extended header and data, for data with a checksum byte, or data with an extended header and a checksum. The extended header allows a Media Data Tunnel implementation additional flexibility. FIG. 6 illustrates an embodiment of a packet structure for an extended header in a Media Data Tunnel implementation. The figure shows three examples of an extended header:

_exheader_with_cdb shows an extended header with a field that identifies the WRITE_BURST purpose as Media Data Tunnel ready, much like is HID mdt_event_header_t.

_exheader_with_cdb_chksm allows optional use of a checksum.

_exheader_with_cdb_chksm_len shows a header extension that expands the prior exheader_with_cdb_chksm to also convey the number of bytes packaged in a WRITE_BURST using a four-bit len length field.

In some embodiments, a Media Data Tunnel relies on the MHL specified scratchpad registers to buffer data before transmission and hold received data before consumption. The MHL specification defines an optional scratchpad, within a sink, source, or dongle. The scratchpad is a set of sixteen or more, 1-byte registers. These registers are accessible at offset 0x40. The first two bytes in this set are required to contain the ADOPTER_ID for the device. Before transmission, the user of a MHL transmitter or receiver writes data to the scratchpad. In the case of receiving data, the MHL transmitter or receiver directs data to this area for the user to retrieve later.

In some embodiments, with regard to scratchpad access, the Media Data Tunnel relies on the MHL specification while providing additional guidance to expedite data transfer. In some embodiments, if a MHL transmitter or receiver requires that the user specify the number of scratchpad bytes to be sent, the Media Data Tunnel sender may indicate the number of scratchpad bytes to be sent only when this number changes. In case a Media Data Tunnel session consists of multiple WRITE_BURSTs with 7-byte structures, the Media Data Tunnel transmitter should set the burst length only once to further reduce latency. During initialization and before the length of a packet is known, the Media Data Tunnel transmitter should set the length to the total number of bytes for the smallest version of the payload structure; for mdt_burst_01_t the value would be six to allow a 2-byte ADOPTER_ID and a 4-byte mdt_mouse_event_t or a 4-byte mdt_keyboard_event_t with truncated 0s, as described below.

In some embodiments, on the other side, the Media Data Tunnel recipient does not read the first two bytes of the scratchpad to qualify the transmitter. Since Media Data Tunnel requires a handshake during extended discovery and each packet has an is HID identification bit in its header, subsequent qualification using the ADOPTER_ID is redundant and may be avoided. To further reduce latency, the Media Data Tunnel recipient retrieves the total number of bytes for the smallest version of the payload structure to access the header of received WRITE_BURST data. In case the header indicates the WRITE_BURST content exceeds the length of the first access, the Media Data Tunnel recipient may read the remaining bytes from the scratchpad in a separate, second attempt.

In some embodiments, for a Media Data Tunnel implementation used to relay HID data, the Media Data Tunnel transmitter relays instances of mdt_burst_01_t to the Media Data Tunnel recipient. Following extended discovery and prior to the first HID event, the Media Data Tunnel transmitter sets the number of scratchpad bytes to be sent to six, the structure is at its smallest size when relaying a mouse events. Prior to its first transmission, the Media Data Tunnel transmitter sets the first two bytes of the scratchpad to its ADOPTER_ID for the Media Data Tunnel recipient. Once the Media Data Tunnel transmitter has HID event data to send, the transmitter reviews the need to update the number of scratchpad bytes to send and populate bytes [2:15] of the scratchpad with event data.

At the receiving end, the Media Data Tunnel receiver will ignore bytes 0 and 1 of its scratchpad. Instead, the Media Data Tunnel recipient will consume events by reading scratchpad bytes [2:5] under the assumption that at the least it will receive a 4-byte mouse event within an mdt_burst_01_t. In case the read is Keyboard bit field is asserted to 1, the Media Data Tunnel transmitter will perform a second read to access scratchpad bytes [6:8] to retrieve the remaining 3 bytes of the 7-byte keyboard packet. The Media Data Tunnel transmitter will also perform a second read if the is CoordinateWordLength is set inside mdt_mouse_event_t. For the second case of isCoordinateWordLength being set, the recipient switches to 7-byte reads when retrieving scratchpad data since the WRITE_BURST transmitter is sending word length coordinates possible for absolute coordinate mapping.

In some embodiments, in addition to controlling the amount and location of data, the encoder optimizes HID content for Media Data Tunnel transmission by creating instances of mdt_mouse_event_t and mdt_keyboard_event_t. These structures may adhere to the Device Class Definition for Human Interface Devices (DCDHID) specification version 1.11 to match data payloads produced by HID devices. As an optimization or adaptation for Media Data Tunnel, mdt_mouse_event_t reassigns bits 4 to 7 in byte 0 from HID specific bits to the Media Data Tunnel HID header. Also, byte 3 is assumed to carry the scroll wheel based on existing de facto standard mouse driver implementations. Further, mdt_mouse_event_t offers word length coordinates when isCoordinateWordLength is set to support absolute coordinate tracking on high-resolution displays as a trade off to lower latency transmission.

In some embodiments, keyboard events are also optimized. As an optimization or adaptation for Media Data Tunnel, mdt_keyboard_event_t reassigns bits 4 to 7 in byte 0 of a keyboard HID event defined in DCDHID from RIGHT CTRL, RIGHT SHIFT, RIGHT ALT, & RIGHT GUI to Media Data Tunnel HID header bits. Prior to dropping these bits, the Media Data Tunnel encoder of a Media Data Tunnel Transmitter performs an OR operation between bits 4 to 7 and bits 0 to 3 of byte 0. This OR operation will use the LEFT CTRL, LEFT SHIFT, LEFT ALT, & LEFT GUI bits to carry assertion of both LEFT and RIGHT keys otherwise stored in byte 0. In addition, mdt_keyboard_event drops byte1 intended for OEM use of a Boot Protocol 1 packet defined by DCDHID specification. Instead of leaving this byte in place to force an 8-byte length for mdt_keyboard_event, the encoder within the Media Data Tunnel Transmitter shifts bytes[2:7] by 1 byte to drop the reserved placeholder when initializing the 7-byte mdt_keyboard_event. As a further optimization and based on common use of Boot Protocol 1, the encoder in the Media Data Tunnel transmitter may drop all but one zero in a series of 0s held by most significant bytes of a mdt_keyboard_event.

For most keyboard input reports, a keyboard update reflects a change in a single key. This change is captured in byte 2 of the Boot Protocol 1 report and byte 1 of mdt_keyboard_event. In such cases, the keyboard fills the remaining bytes of its event with 0s. To reduce latency, the encoder could drop the last, three trailing 0s. Further, the Media Data Tunnel Transmitter manages keyboard LED states rather than to expect this action from the Media Data Tunnel receiver. The Device Class Definition for Human Interface Devices (HID) specification 1.11 explains that the LED state of a keyboard should be maintained by the host rather than the keyboard and allows for the keyboard host to control LED status. While in a Media Data Tunnel implementation for HID it is possible to implement this function inside the host supporting Media Data Tunnel receiver, leaving LED control in the Media Data Tunnel transmitter reduces the need for bidirectional WRITE_BURSTs. By having LED control in the Media Data Tunnel transmitter, the Media Data Tunnel receiver within a MHL transmitter does not need to be a Media Data Tunnel transmitter at any time and only needs to support WRITE_BURST transmission during extended discovery. With regard to such HID data, FIG. 7 illustrates payload structures for an embodiment of a Media Data Tunnel encoder in comparison to standard HID structures.

Stage 3:

Relay Data. In some embodiments, an MHL transmitter and transmitter are instructed to implement MHL specified WRITE_BURST and SET_INT commands to relay data from the Media Data Tunnel transmitter to the Media Data Tunnel receiver. In addition to the aforementioned scratchpad, the Media Data Tunnel relies on MHL specified interrupt registers, WRITE_BURST command, and SET_INT command to relay data between a MHL transmitter and receiver. Per the MHL specification, the MHL transmitter and receiver offer two single-byte interrupt registers. Interrupt registers are at offset 0x20. The registers allow the user to specify an interrupt or interrupts for transmission using a SET_INT command.

In some embodiments, to avoid scratchpad access collisions between the user and a MHL transmitter or receiver state machine, the MHL specification provides interrupt registers and a coordination process. The coordination process offers a way to manage scratchpad access using the SET_INT command. The specification implies that before a user writes data to a local scratchpad, the user will check to ensure a WRITE_BURST transmission is not outstanding. A WRITE_BURST transmission is outstanding if the WRITE_BURST transmitter sent a WRITE_BURST command but, has yet to send a DSCR_CHG interrupt using the SET_INT command. The specification also implies that the user will not write to the scratchpad if scratchpad access has been granted for receipt of a WRITE_BURST. A receipt is pending if the WRITE_BURST recipient sent a GRT_WRT interrupt using the SET_INT command but, has not yet received a DSCR_CHG interrupt via the SET_INT command, as a response. Also, the MHL specification implies that a user will not allow receipt of a WRITE_BURST through a transmission of a GRT_WRT using the SET_INT command if the user is preparing to send a WRITE_BURST command or is still handling a receipt of a prior WRITE_BURST command.

In some embodiments, the Media Data Tunnel is to be implemented in full adherence with the MHL specification while allowing needed performance to support HID and some slightly more demanding applications. In full adherence to MHL, the Media Data Tunnel transmitter and recipient access scratchpad and interrupt registers as defined by the MHL specification. Similarly, Media Data Tunnel sender and receiver use SET_INT and WRITE_BURST commands to relay data in adherence to the MHL specification.

In some embodiments, the Media Data Tunnel relies on the MHL specified coordination sequence for WRITE_BURST commands with additional, Media Data Tunnel specific guidance. The transmitter sends a single SET_INT with REQ_WRT and DSCR_CHG in advance of its need to relay WRITE_BURST data. This advanced request will free the transmitter in two ways. First, the WRITE_BURST transmitter will not be subject to the time it takes to send a REQ_WRT when it needs to send data; the REQ_WRT would have been sent in advance. Second, it will not need to wait for a GRT_WRT response to its REQ_WRT request, a transaction that may take as long as 10 ms per the MHL specification. In effect, advance transmission of SET_INTs separates time consumed for WRITE_BURST coordination from time needed to relay Media Data Tunnel information within a WRITE_BURST command. Also, the Media Data Tunnel sender may relay DSCR_CHG and REQ_WRT interrupts using a single SET_INT instead of sending these interrupts independently and at different stages of a WRITE_BURST transaction. This pairing of a DSCR_CHG and REQ_WRT into a single SET_INT message further reduces time needed to relay data using WRITE_BURST.

In some embodiments, to accommodate advance and combined transmission of a REQ_WRT and DSCR_CHG interrupts, the Media Data Tunnel recipient has the opportunity to abort a pending WRITE_BURST that isn't already being received. While the MHL specification doesn't offer the WRITE_BURST recipient a method to prevent a WRITE_BURST, the specification implicitly ensures that SET_INT commands are handled at all times by mandating that the recipient send back an ACK or an ABORT. Using this implicit guarantee, the Media Data Tunnel recipient sends a REQ_WRT interrupt using SET_INT command when it needs to abort a pending WRITE_BURST. To remain compliant with MHL, the Media Data Tunnel transmitter responds to this SET_INT command with an ACK, if it is accepted, and separately the Media Data Tunnel transmitter sends a DSCR_CHG interrupt using a SET_INT command. Should the Media Data Tunnel transmitter fail to send the DSCR_CHG, the Media Data Tunnel recipient may repeat a REQ_WRT every 10 ms, the timeout specified by MHL for a WRITE_BURST recipient awaiting a GRT_WRT response to a REQ_WRT. In case the WRITE_BURST recipient needs to relay an abort during reception of a WRITE_BURST, the recipient responds to a WRITE_BURST with an ACK and subsequently send a SET_INT to convey the REQ_WRT.

In some embodiments, for an HID implementation of Media Data Tunnel, transfer of data using WRITE_BURST and SET_INT adheres to the Media Data Tunnel definition. A likely sequence reflects an extended discovery. Within this discovery, the Media Data Tunnel transmitter sends the MDTREQ01_FULL token and receives a MDTACK_2000, in response. This exchange establishes an agreement between the Media Data Tunnel transmitter and receiver. Also, the exchange allows the Media Data Tunnel transmitter to qualify the Media Data Tunnel receiver for HID service over Media Data Tunnel. In some embodiments, commands for extended discovery are as illustrated in Table 1:

TABLE 1

|  | From | To | Command | Content |
| --- | --- | --- | --- | --- |
| EXTENDED DISCOVERY | MDT Recipient | | sets burst length to 16 | |
|  | MDT Sender | MDT Recipient | SET_INT | REQ_WRT |
|  | MDT Recipient | MDT Sender | SET_INT | GRT_WRT |
|  | MDT Sender | MDT Recipient | WRITE_BURST | "MDTREQ01_FULL" |
|  | MDT Sender | MDT Recipient | SET_INT | DSCR_CHG |
|  | MDT Recipient | MDT Sender | SET_INT | REQ_WRT |
|  | MDT Sender | MDT Recipient | SET_INT | GRT_WRT |
|  | MDT Recipient | MDT Sender | WRITE_BURST | "MDTACK_2000" |
|  | MDT Recipient | MDT Sender | SET_INT | DSCR_CHG |

In some embodiments, following extended discovery, the Media Data Tunnel transmitter sets the ADOPTER_ID bytes in the scratchpad. For purposes of this example Media Data Tunnel recipient's ADOPTER_ID is assumed to be 0x0000. Next, the Media Data Tunnel transmitter sets the burst length to six to support the smallest version of mdt_burst_t packet structure, the instance for mouse events. Afterwards, HID events may be sent as separate WRITE_BURST commands with associated interrupts and transmissions of SET_INT command. Since each of the events involves the same packet structure, the burst length is not set again. In some embodiments, MDT sender transmits HID events may be as follows in Table 2:

TABLE 2

| | From | To | Command | Content |
|---|---|---|---|---|
| MDT Sender Transmits HID Events | MDT Sender | MDT Recipient | SET_INT set ADOPTER_ID in the scratchpad | DSCR_CHG, REQ_WRT "00 00" |
| | MDT Recipient | | sets burst length to 6 | |
| | MDT Recipient | MDT Sender | SET_INT | GRT_WRT |
| | MDT Sender | MDT Recipient | WRITE_BURST | "81 00 01 00" |
| | MDT Recipient | | reads scratchpad bytes [2:5] | |
| | MDT Sender | MDT Recipient | SET_INT | DSCR_CHG, REQ_WRT |
| | MDT Recipient | MDT Sender | SET_INT | GRT_WRT |
| | MDT Sender | MDT Recipient | WRITE_BURST | "81 00 01 00" |
| | MDT Recipient | | reads scratchpad bytes [2:5] | |
| | MDT Sender | MDT Recipient | SET_INT | DSCR_CHG, REQ_WRT |
| | MDT Recipient | MDT Sender | SET_INT | GRT_WRT |
| | MDT Sender | MDT Recipient | WRITE_BURST | "81 00 01 00" |
| | MDT Recipient | | reads scratchpad bytes [2:5] | |
| | MDT Sender | MDT Recipient | SET_INT | DSCR_CHG, REQ_WRT |

Stage 4 & 5:

Data Decoding and Data Consumption. In some embodiments, a Media Data Tunnel transmission is concluded as the Media Data Tunnel receiver decodes the data it receives and consumes it. The definition of decoding was provided in Stage 2. Since the consumption is application dependent the following definition is optimal and intended as an example.

FIG. 8 illustrates layers for an embodiment of a Media Data Tunnel. The illustrated layered stack compares a possible implementation of a MHL transmitter intended to receive HID events to USB driver layers inside a Linux or Android system. In some embodiments, the elements of FIG. 8 represent a software implementation for an MHL transmitter within a mobile device. The MDT HID, HID/MDT Driver, Sil9234 Driver, and SMBUS or I2C Driver layers of a Media Data Tunnel implementation map directly to the USB Driver, USB HID, USB Core, and OHCI/EHCI layers. The MHL transmitter component responsible for WRITE_BURST is significantly thinner than the USB CORE layer responsible for HUB support and device discovery. Similarly, the HID/MDT decoder is an extremely thin layer. However, the Media Data Tunnel HID Driver is comparable to a USB driver with the entry point as the primary difference. While USB drivers register with the USB stack to receive payloads from USB packets, the Media Data Tunnel HID Driver could be called directly by the HID/MDT Decoder and could rely on a global buffer to receive the payload. Despite this difference, both the USB Drivers and Media Data Tunnel HID Driver call the HID EVENT GENERATOR using input_report type functions to relay events up to user space. The translation offered by the decoder in this implementation allows for a standard HID event consumer to receive events from Media Data Tunnel as though they were coming from any USB device.

Figure 9:
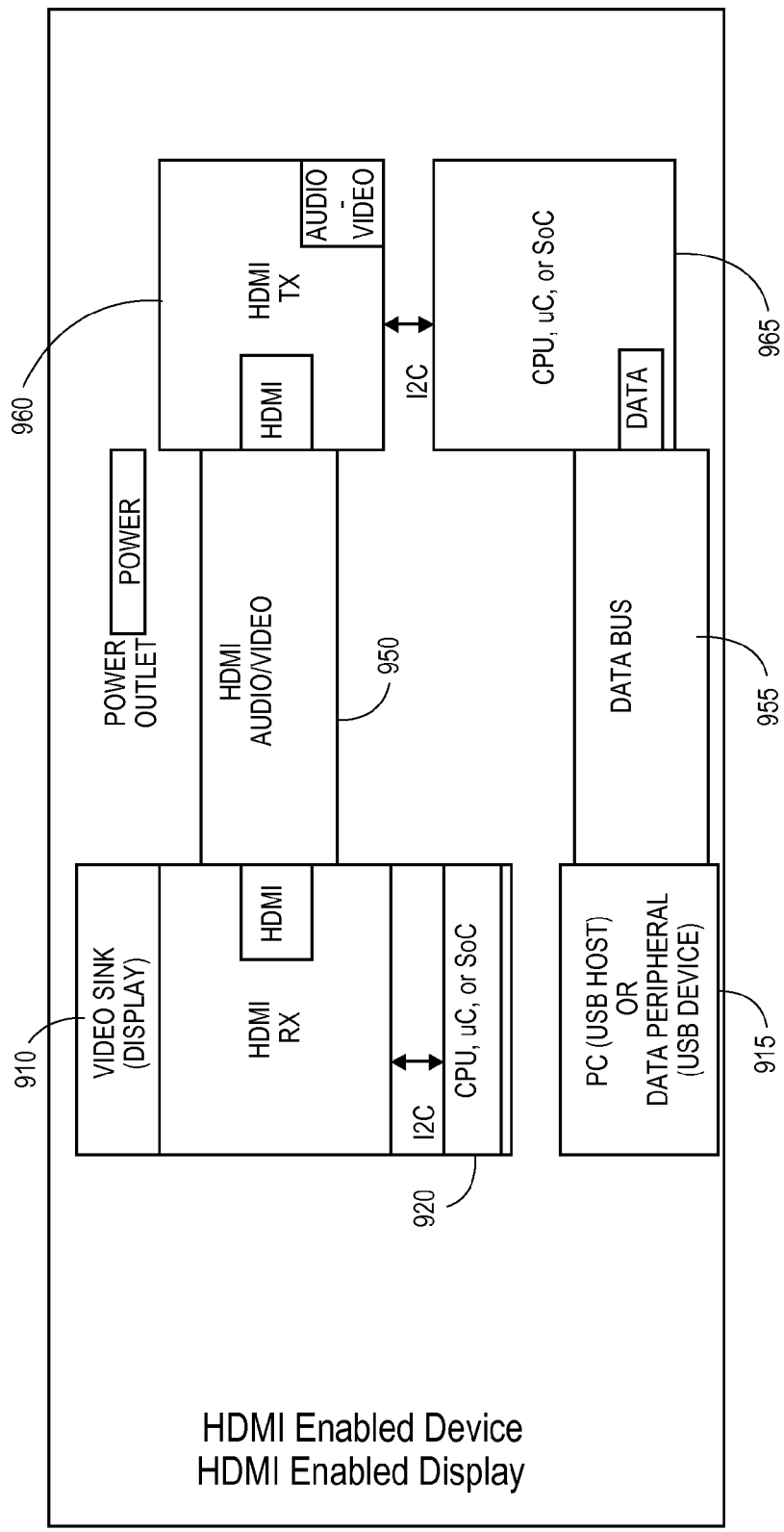
FIG. 9 illustrates a connection between an HDMI enabled video display and an HDMI enabled source device.

Media Data Tunnel offers a means to expand the value and feature set offered by MHL. FIG. 9 illustrates a connection between an HDMI enabled video display and an HDMI enabled source device. In this illustration, an HDMI sink 910 (such as a television or other video display) is coupled with a video source 960 via an HDMI interface connection 950. As provided in FIG. 9, the HMI sink 910 includes an HDMI receiver 912, which may be coupled with a processing element 920 (such as a CPU, microprocessor, or SoC). The video source 960 includes an HDMI transmitter 962 coupled with processing element 965.

In this scenario, the data bus is discrete in operation. To relay peripheral data other than A/V, the video source 910 may be coupled with a USB element 915 via a data bus 955, where the USB element may be a personal computer (acting as a USB host) or a data peripheral (acting as a USB device). Thus, the source device 960 does include both a first protocol (HDMI) data transmission and a second protocol (USB) data transmission, where such transmissions utilize separate data channels 950 and 955 to handle the bandwidth of the two protocols.

Figure 10:
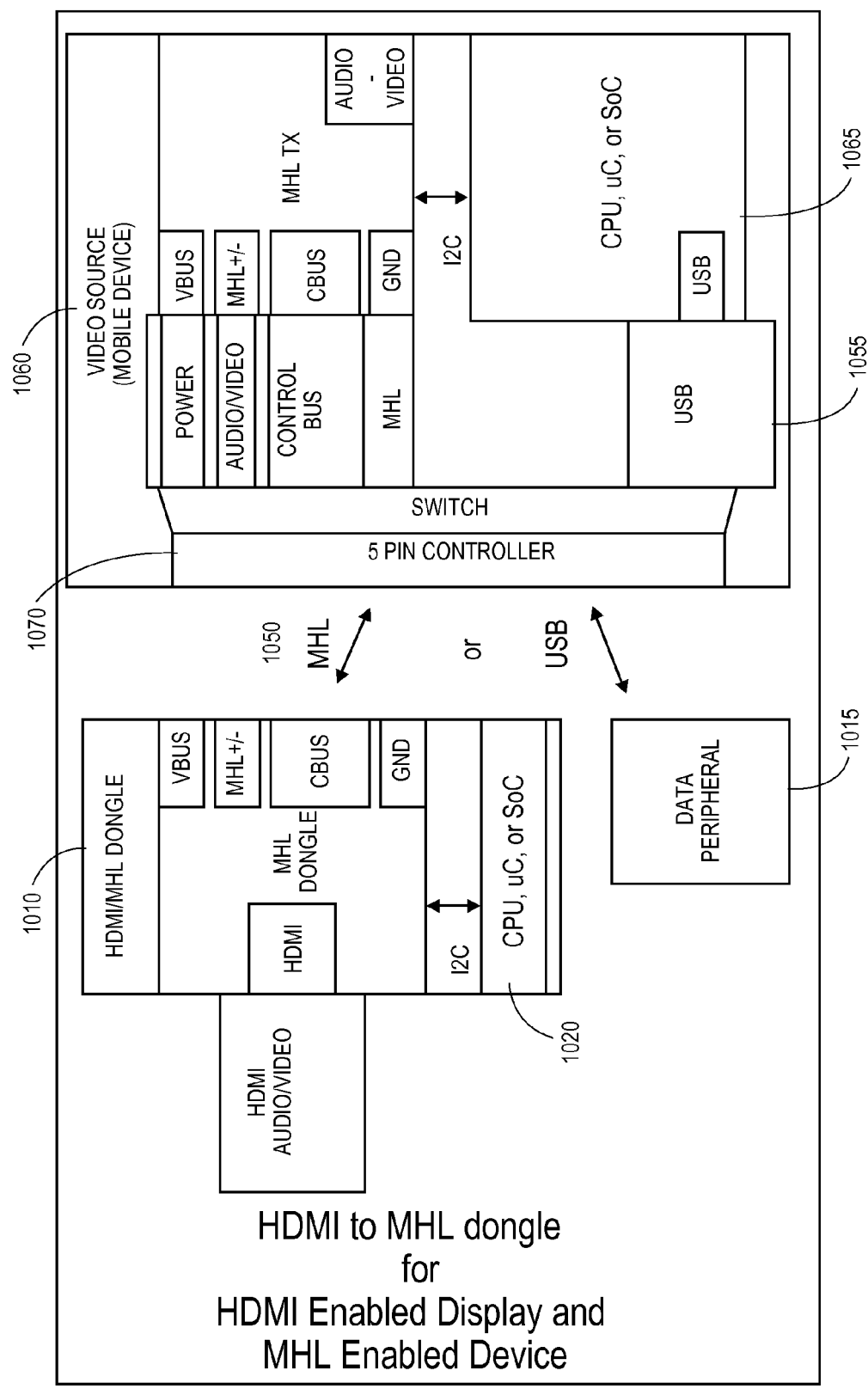
FIG. 10 illustrates a connection between an HDMI/MHL dongle and an MHL enabled video source device.
Figure 11:
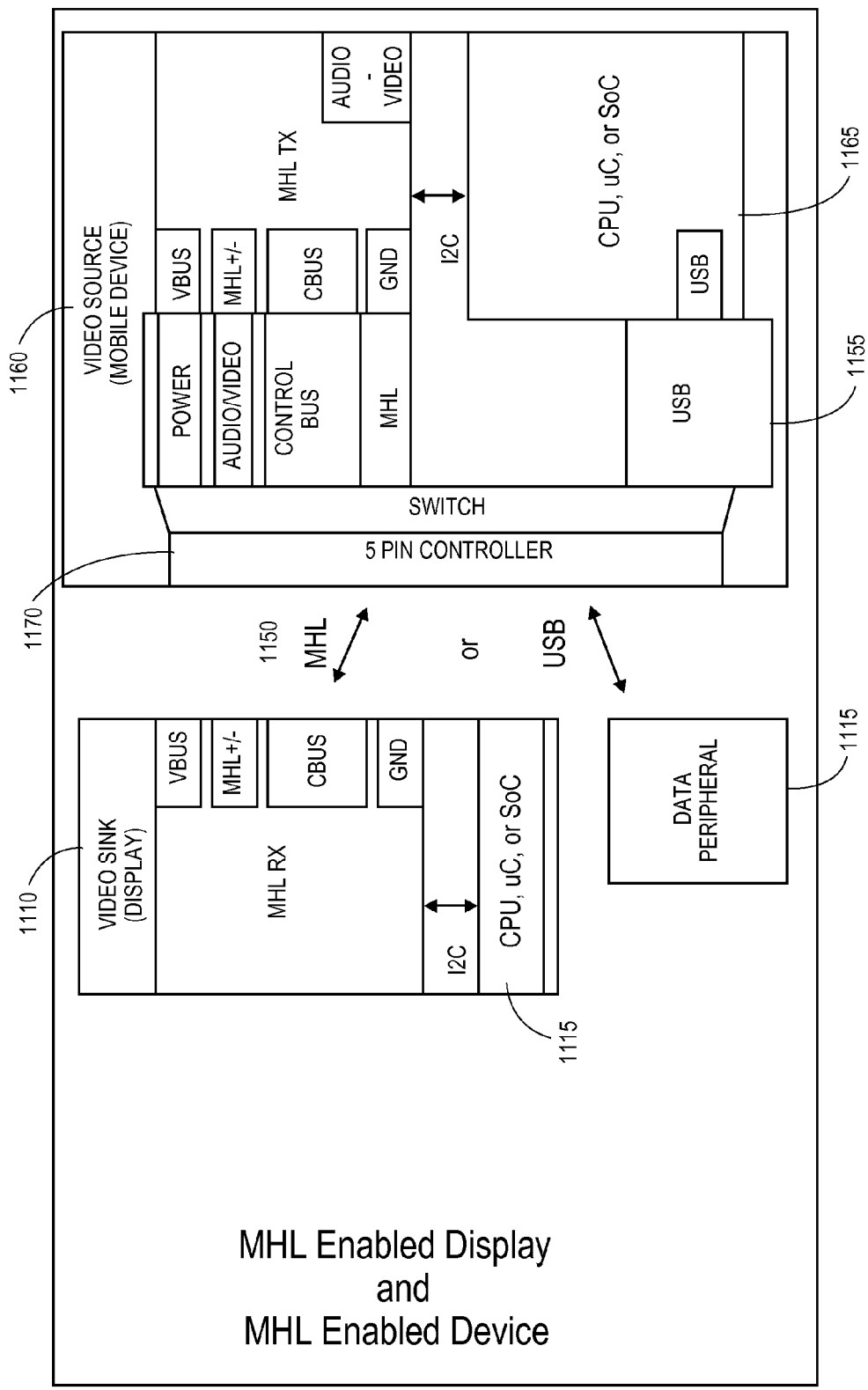
FIG. 11 illustrates a connection between an MHL enabled video sink device and an MHL enabled video source device.

Unlike HDMI, the MHL specification targets applications that share the physical connector between multiple protocols, but the protocols are supported exclusively of one another rather than simultaneously. FIG. 10 illustrates a connection between an HDMI/MHL dongle and an MHL enabled video source device. FIGS. 10 and 11 illustrate implementations that share a 5-pin connector of a mobile device between HID and MHL data transmitted mutually exclusively. In FIG. 10, an MHL dongle 1010, which converts data between HDMI format 1005 and MHL format, is coupled with a video source 1060 via an MHL/USB interface connection 1050. The video source 1060 may include a mobile device. As provided in FIG. 10, the MHL dongle 1010 may include a processing element 1020, such as a CPU, microprocessor, or SoC. The video source 1060 includes an MHL transmitter 1062 coupled with a processing element 1065.

The video source includes a five-pin connector 1070 and a switch 1072 for the MHL and USB interface 1050. The switch provides a path from the connector for MHL data to the MHL receiver 1062 and USB data via a USB link 1055 to the processing element 1065 of the video source. The MHL USB may be connected with a discrete data peripheral 1015 for the transfer of USB data. Thus, in this case the source device 1060 includes both a first protocol (MHL) data transmission and a second protocol (USB) data transmission utilizing a single five-pin connector, but such connector can only transfer the data for one of such protocols at a time, with MHL and USB both utilizing the full bandwidth of the interface. The exclusivity between two protocols applies to the MHL specification if the MHL receiver is a MHL dongle or a MHL sink. FIG. 11 illustrates a connection between an MHL enabled video sink device and an MHL enabled video source device. In this illustration, an MHL enabled video sink 1110 is coupled with a video source 1160 via an MHL/USB interface connection 1150. The video source 1160 may include a mobile device. As provided in FIG. 11, the MHL sink 1110 may include an MHL transmitter 1112 and a processing element 1120. The video source 1160 may include an MHL transmitter 1162 coupled with a processing element 1165.

In FIG. 11, the video source 1160 includes a five-pin connector 1170 and a switch 1172 for the MHL and USB interface 1150. The switch provides a path for MHL data to the MHL receiver 1162 and USB data via a USB link 1155 to the processing element 1165 of the video source. The MHL USB may be connected with data peripheral 1115 for the transfer of USB data. Similar to FIG. 10, in this case the source device 1160 includes both a first protocol (MHL) data transmission and a second protocol (USB) data transmission utilizing a single five-pin connector, but such connector can only transfer the data for one of such protocols at an time, with MHL and USB both utilizing the full bandwidth of the interface.

Figure 12:
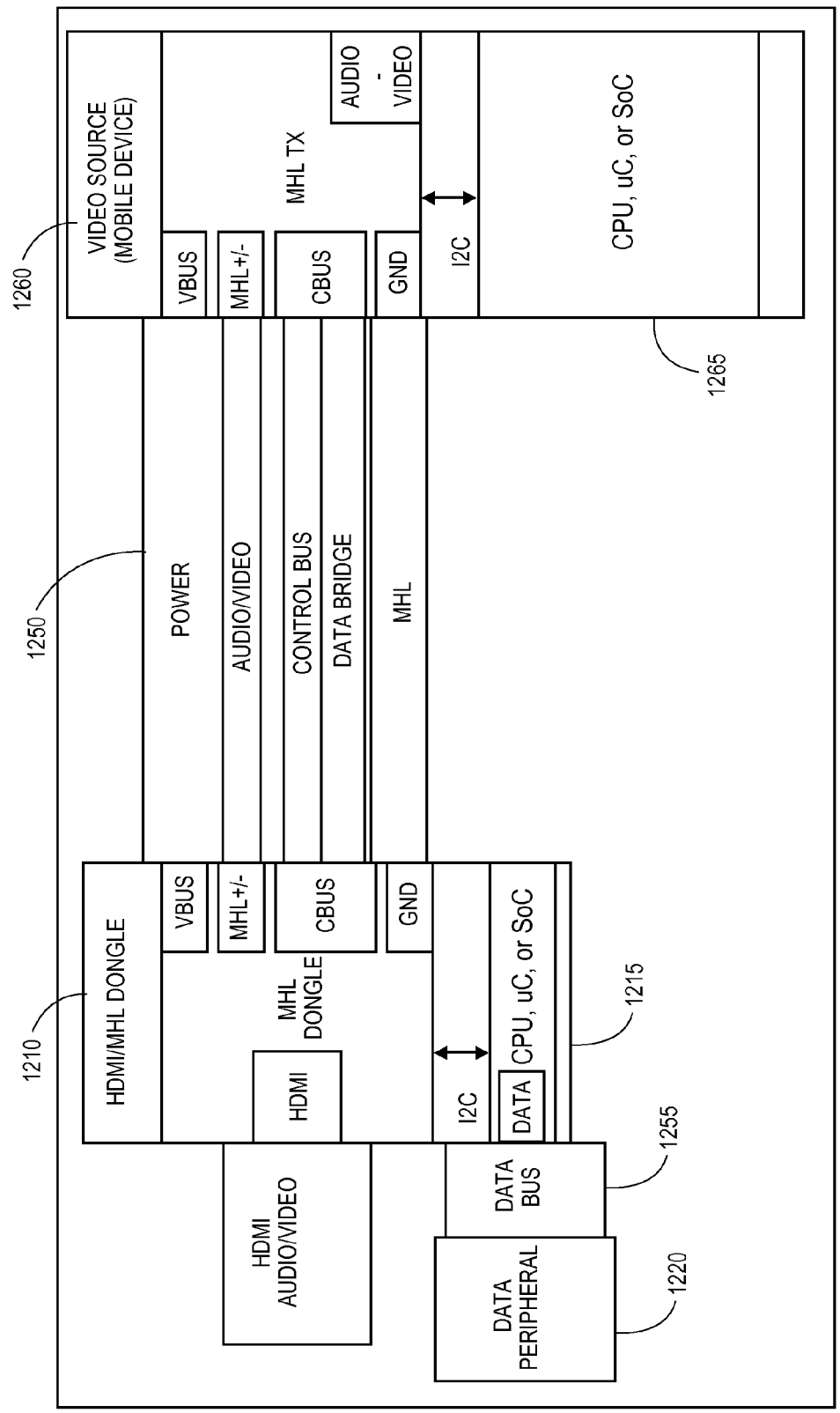
FIG. 12 illustrates an embodiment of a connection between an HDMI/MHL dongle and an MHL enabled video source device.

Media Data Tunnel enhances MHL to allow data tunneling for simultaneous A/V and peripheral data transmission. FIG. 12 illustrates an embodiment of a connection between an HDMI/MHL dongle and an MHL enabled video source device. In contrast to FIGS. 10 and 11, FIGS. 12 and 13 illustrate a Media Data Tunnel enabled system that simultaneously exchanges HID and MHL data between its two peers. In FIG. 12, an MHL dongle 1210, converting data between HDMI format 1205 and MHL format, is coupled with a video source 1260 via an MHL interface connection 1250, wherein the video source 1260 may include a mobile device. As provided in FIG. 12, the MHL dongle 1210 may include a processing element 1220. The video source 1260 includes an MHL transmitter 1262 coupled with a processing element 1265.

In some embodiments, the interface 1250 between the MHL dongle 1210 and the video source 1260 includes a data tunnel 1252, where the data tunnel may be a Media Data Tunnel as described above. In some embodiments, the data tunnel 1252 may be utilized for the transmission of second protocol (USB) data via generic commands of the first protocol (MHL). As illustrated, the processing element 1220 of the MHL dongle 1210 may be coupled with a data peripheral 1207 for the transfer of USB data via a data bus 1255. Thus, in this implementation the video source 1260 may operate as a USB host element, where in some embodiments USB data is transferred between such USB host and a USB device element, such as data peripheral 1207, via the data tunnel 1252, thus allowing simultaneous transfer of MHL data and USB data.

Figure 13:
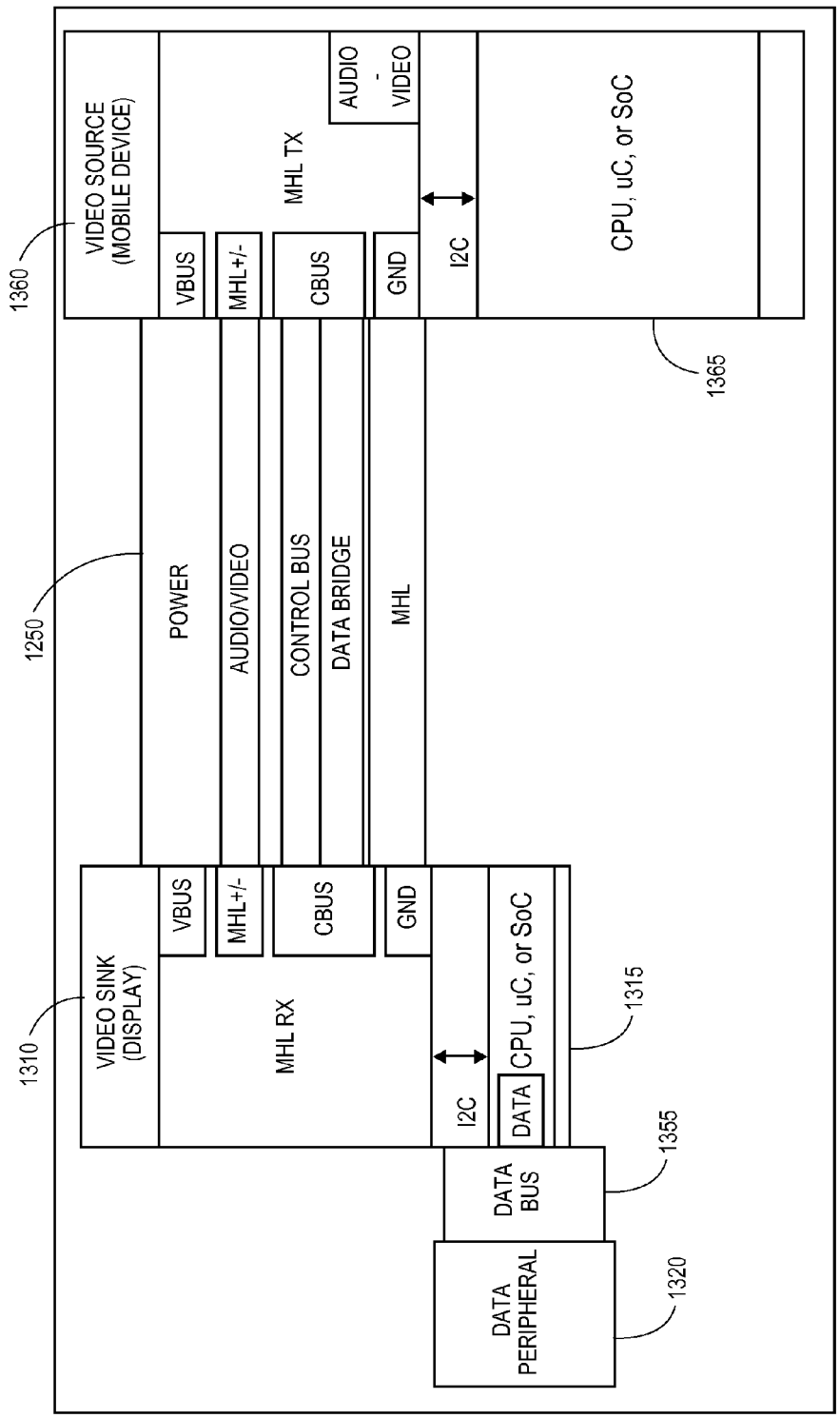
FIG. 13 illustrates a connection between an MHL enabled video sink device and an MHL enabled video source device.

The benefits of Media Data Tunnel apply equally if the MHL receiver is a MHL dongle or a MHL sink. FIG. 13 illustrates a connection between an MHL enabled video sink device and an MHL enabled video source device. In this illustration, an MHL enabled video sink device 1310 is coupled with a video source 1360 via an MHL interface connection 1350, wherein the video source 1360 may include a mobile device. As provided in FIG. 13, the MHL sink 1310 may include a processing element 1320. The video source 1360 includes an MHL transmitter 1362 coupled with a processing element 1365.

In some embodiments, the interface 1350 between the MHL sink device 1310 and the video source 1360 includes a data tunnel 1352, where the data tunnel may be a Media Data Tunnel as described above. In some embodiments, the data tunnel 1352 may be utilized for the transmission of second protocol (USB) data via generic commands of the first protocol (MHL). As illustrated, the processing element 1320 of the MHL sink device 1310 may be coupled with a data peripheral 1307 for the transfer of USB data via a data bus 1355. Thus, in some embodiments a video source 1360 may operate as a USB host element, where USB data is transferred between such USB host and a USB device element, such as data peripheral 1307, via a data tunnel 1352, thus allowing simultaneous transfer of MHL data and USB data.

Figure 14:
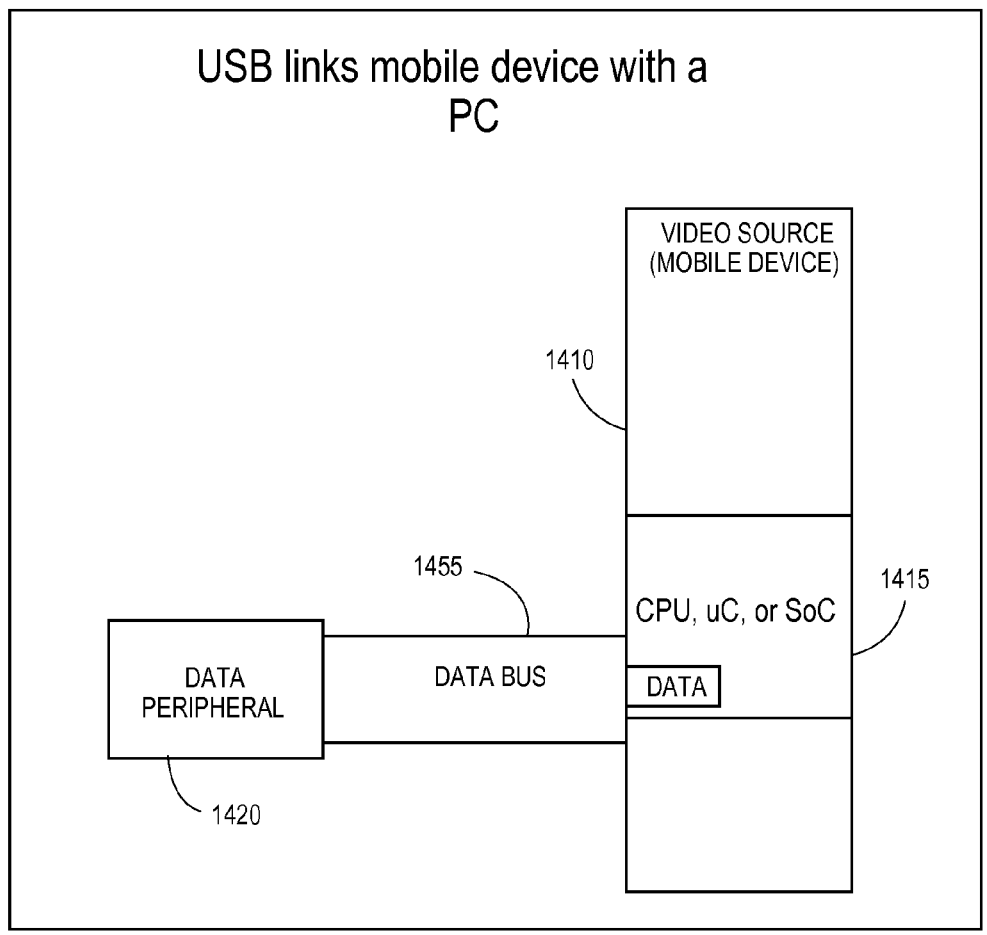
FIG. 14 illustrates USB links of a mobile device with a data peripheral.

Media Data Tunnel allows MHL enabled mobile devices to better serve computing use cases. Without Media Data Tunnel enabled MHL, a mobile device may host data peripherals but would generally need a separate port to transmit A/V data. FIG. 14 illustrates USB links of a mobile device with a data peripheral, such as a mouse. In this illustration, a video source 1410 including a processing element 1415, illustrated as a CPU (Central Processing Unit), microprocessor, or SoC (System on Chip) wherein the processing element is coupled via a data bus 1455 with a data peripheral such as a mouse 1420. In some embodiments, the operation of the data peripheral 1420 may include use of generic commands to simultaneously allow for support for the data peripheral and of audio/video data transfer.

Figure 15:
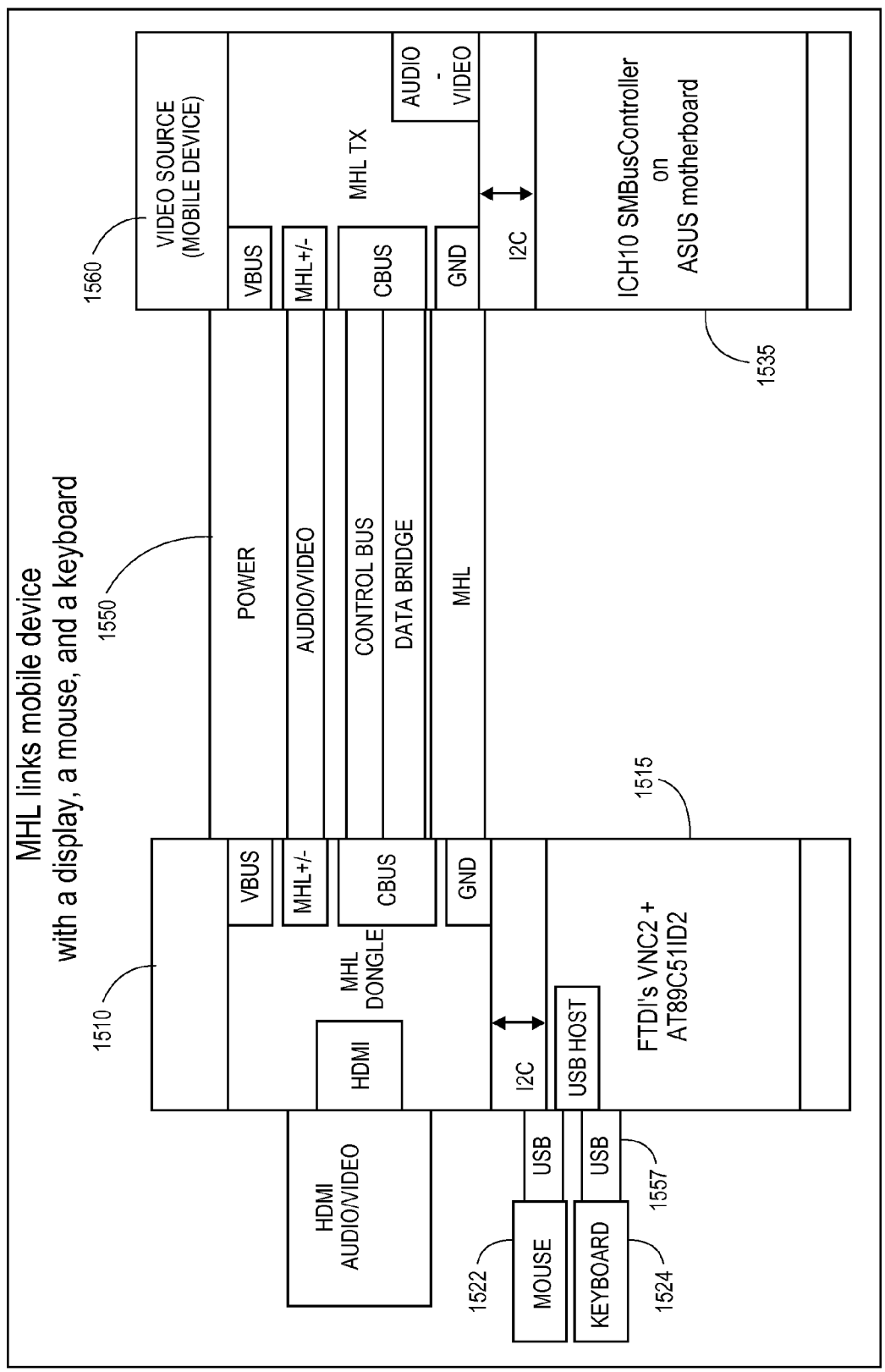
FIG. 15 illustrates an embodiment of a link of a mobile device with human interface devices.

An MHL enabled mobile device with Media Data Tunnel may be simultaneously connected to a display and data peripherals through a single connector. FIG. 15 illustrates an embodiment of a link of a mobile device with human interface devices. FIG. 15 provides a specific example of data peripherals (USB mouse and USB keyboard) and a specific example of a data bus (USB). In this illustration, an MHL dongle 1510, converting data between HDMI format 1505 and MHL format, is coupled with a video source 1560 via an MHL interface connection 1550, wherein the video source 1560 may include a mobile device. As provided in FIG. 15, the MHL dongle may include a processing element 1520. The video source 1560 includes an MHL transmitter 1562 coupled with a processing element 1565.

In some embodiments, the interface 1550 between the MHL dongle 1510 and the video source 1560 includes a data tunnel 1552, where the data tunnel may be a Media Data Tunnel as described above, where the data tunnel 1552 provides for the transmission of second protocol (USB) data via generic commands of the first protocol (MHL). As illustrated, the processing element 1520 of the dongle 1510 may be coupled with one or more human interface devices for the transfer of USB HID data via one or more USB connections 1557. In this illustration, the human interface devices are a mouse 1522 and a keyboard 1524. Thus, in this implementation the video source 1560 may operate as a USB host element and the MHL dongle as a USB device, where in some embodiments USB data generated by human interface devices is transferred between such USB host and USB device element via the data tunnel 1552, thus allowing simultaneous transfer of MHL data and USB HID data.

Figure 16:
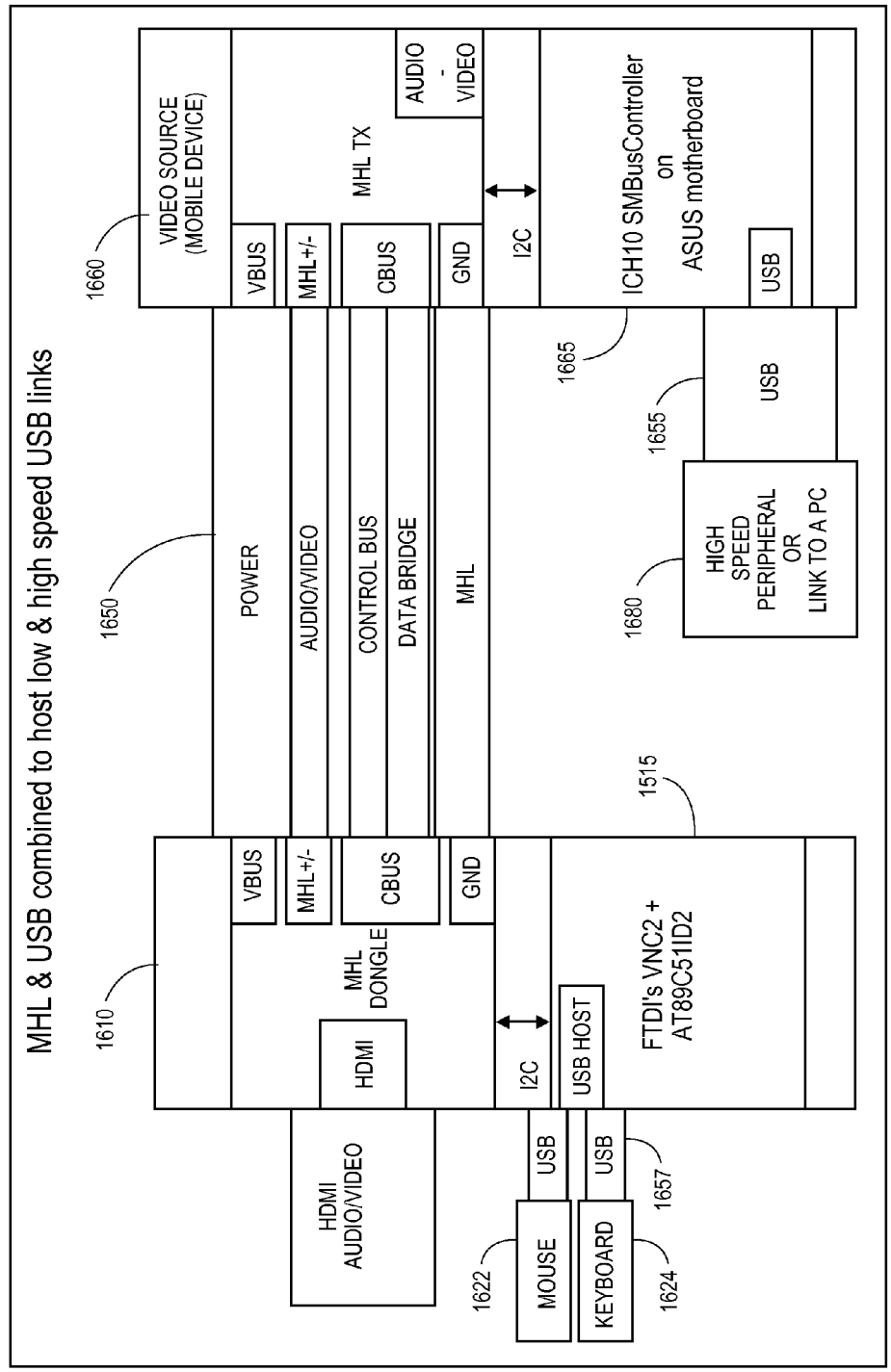
FIG. 16 illustrates an embodiment of a link of a mobile device with human interface devices.

While Media Data Tunnel offers a significant advantage to mobile device users, this technology may only serve low bandwidth data peripherals. FIG. 16 illustrates an embodiment of a link of a mobile device with human interface devices. In certain implementations, high-speed peripherals may be required to be connected directly to a mobile device due to existing bandwidth constraints. However, embodiments are not limited to this configuration. In this illustration, an MHL dongle 1610, converting data between HDMI format 1605 and MHL format, is coupled with a video source 1660 via an MHL interface connection 1650, wherein the video source 1560 may include a mobile device. As provided in FIG. 16, the MHL dongle 1610 may include a processing element 1620. The video source 1660 includes an MHL transmitter 1662 coupled with a processing element 1565. In some embodiments, the video source 1660 may further includes a USB connection 1655 to high speed peripheral or a link to a personal computer 1680.

In some embodiments, the interface 1650 between the MHL dongle 1610 and the video source 1660 includes a data tunnel 1652, where the data tunnel may be a Media Data Tunnel as described above, where the data tunnel 1652 provides for the transmission of second protocol (USB) data via generic commands of the first protocol (MHL). As illustrated, the processing element 1620 of the dongle 1610 may be coupled with one or more human interface devices for the transfer of USB HID data via one or more USB connections 1657. In this illustration, the human interface devices are a mouse 1622 and a keyboard 1624. Thus, in this implementation the video source 1660 may operate as a USB host element and the MHL dongle as a USB device, where in some embodiments USB data generated by human interface devices is transferred between such USB host and USB device element via the data tunnel 1652, thus allowing simultaneous transfer of MHL data and USB HID data. In some embodiments, the video source 1660 is also connected via an USB connection to a high speed peripheral or personal computer 1680. Thus, in some embodiments the MHL data and low speed USB data may be transferred via a first interface simultaneously with high-speed USB data transferred via second interface.

Figure 17:
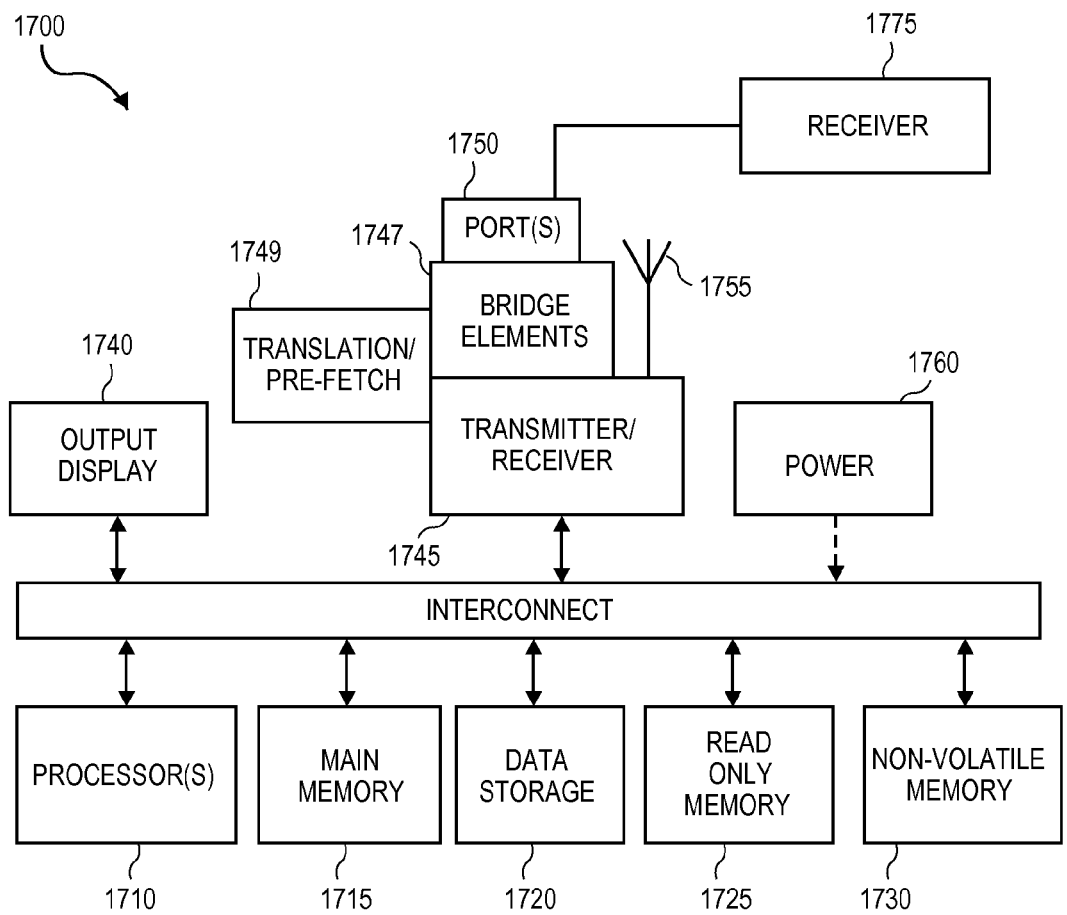
FIG. 17 illustrates an embodiment or system including a data tunnel for transmission of certain data.

FIG. 17 illustrates an embodiment or system including a data tunnel for transmission of certain data. The apparatus or system (referred to here generally as an apparatus) may include a data tunnel allowing for data of a second protocol to be transferred using generic commands of a first protocol. In an example, the first protocol is MHL and the second protocol is USB. However, embodiments are not limited to any particular protocols. In this illustration, certain standard and well-known components that are not germane to the present description are not shown. In some embodiments, the apparatus 1700 may include a video source device, a video sink device, or a dongle to convert data protocol, or other devices transferring data in multiple protocols.

In some embodiments, the apparatus 1700 comprises an interconnect or crossbar 1705 or other communication means for transmission of data. The apparatus 1700 may include a processing means such as one or more processors or other processing elements 1710 coupled with the interconnect 1705 for processing information. The processors 1710 may comprise one or more physical processors and one or more logical processors. The interconnect 1705 is illustrated as a single interconnect for simplicity, but may represent multiple different interconnects or buses and the component connections to such interconnects may vary. The interconnect 1705 shown in FIG. 17 is an abstraction that represents any one or more separate physical buses, point-to-point connections, or both connected by appropriate bridges, adapters, or controllers.

In some embodiments, the apparatus 1700 further comprises a random access memory (RAM) or other dynamic storage device or element as a main memory 1715 for storing information and instructions to be executed by the processors 1710. RAM memory includes dynamic random access memory (DRAM), which requires refreshing of memory contents, and static random access memory (SRAM), which does not require refreshing contents, but at increased cost. In some embodiments, main memory may include active storage of applications including a browser application for using in network browsing activities by a user of the apparatus 1700. DRAM memory may include synchronous dynamic random access memory (SDRAM), which includes a clock signal to control signals, and extended data-out dynamic random access memory (EDO DRAM). In some embodiments, memory of the apparatus may include certain registers or other special purpose memory.

The apparatus 1700 may include a data storage 1720, including a hard disk drive or solid-state drive. The apparatus 1700 also may comprise a read only memory (ROM) 1725 or other static storage device for storing static information and instructions for the processors 1710. The apparatus 1700 may include one or more non-volatile memory elements 1730 for the storage of certain elements, including, for example, flash memory.

The apparatus 1700 may also be coupled via the interconnect 1705 to an output display 1740. In some embodiments, the display 1740 may include a liquid crystal display (LCD) or any other display technology, for displaying information or content to a user. In some environments, the display 1740 may include a touch-screen that is also utilized as at least a part of an input device. In some environments, the display 1740 may be or may include an audio device, such as a speaker for providing audio information.

One or more transmitters or receivers 1745 may also be coupled to the interconnect 1705. In some embodiments, the receivers or transmitters 1745 may be coupled to a connector 1750 for the transmission of data in multiple protocols to another apparatus or system 1775 via a data link having a data tunnel 1770, where the data link may be, for example, the cable 150 illustrated in FIG. 1. The apparatus 1700 may further include one or more omnidirectional or directional antennas 1755 for the reception of data via radio signals.

The apparatus 1700 may also comprise a power device or apparatus 1760, which may comprise a power supply, a battery, a solar cell, a fuel cell, or other system or device for providing or generating power. The power provided by the power device or system 1760 may be distributed as required to elements of the apparatus 1700.

Figure 18:
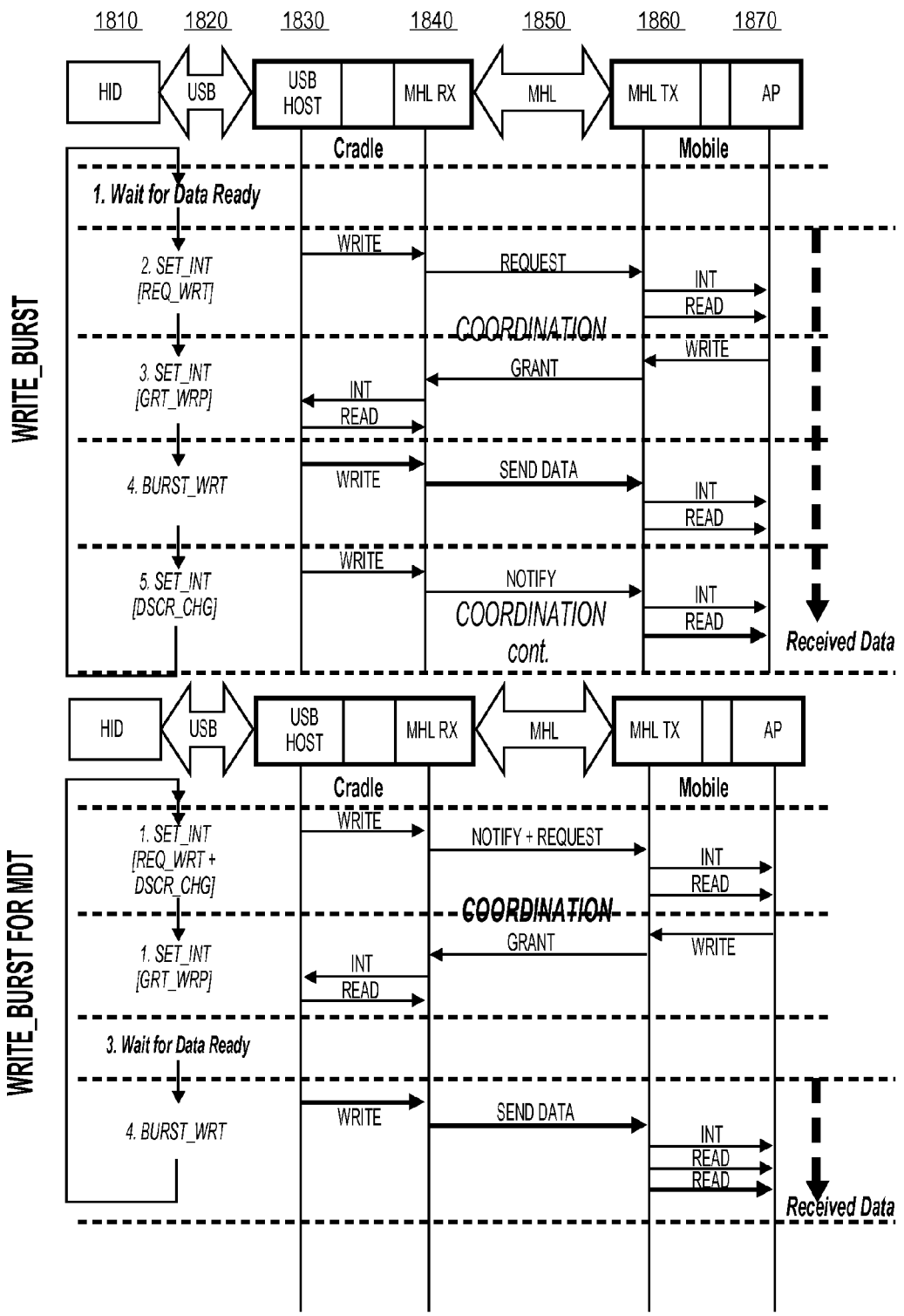
FIG. 18 is a timing diagram to illustrate an embodiment of a process for communication utilizing a Media Data Tunnel.

FIG. 18 is a timing diagram to illustrate an embodiment of a process for communication utilizing a Media Data Tunnel. In this illustration, communication between an HID 1810 and a USB host 1830 via a USB connection and between an MHL receiver 1840, as illustrated in connection with a cradle element, and an MHL transmitter 1860 via an MHL connection 1850 is provided. As illustrated, communications utilizing a WRITE_BURST command 1800 and utilizing the WRITE_BURST COMMAND with a Media Data Tunnel 1805 are illustrated. As shown, the Media Data Tunnel may allow for reduced overhead in operation and reduced latency for data reception.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable non-transitory storage medium having stored thereon computer program instructions, which may be used to program a computer (or other electronic devices) to perform a process according to the present invention. The computer-readable storage medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

In some embodiments, an apparatus includes a transmitter or receiver for the transmission or reception of data; a processing element for handling the data of the apparatus; and a connector for the transfer of the data, the connector to connect to a data channel and to connect to a control channel. The processing element is to provide for transfer of data of a first protocol in the control channel, the transfer of data via the control channel including the use of one or more generic commands of the first protocol for the transfer of data of a second protocol. The data of the second protocol is optimized before it is sent over the first protocol, and the data transfer in the data channel and data transfer in the control channel are simultaneous at least in part.

In some embodiments, the data channel of the apparatus includes one or more data transmission lines. In some embodiments, the control channel includes a control bus.

In some embodiments, the transmission of data via the control channel also includes other commands of the first protocol, and wherein the one or more generic commands may be intermixed with the other commands of the first protocol. In some embodiments, use of the second protocol is qualified through extended discovery including discovery of capabilities regarding packet structure and service performance.

In some embodiments, wherein one or more messages of the second protocol can be sent in a single data burst of the first protocol. In some embodiments, each data burst is coordinated through interrupt messages, wherein a plurality of the interrupt message are aggregated and sent out in a single message.

In some embodiments, an identification field of the first protocol through the control channel has a size of less than or equal to two bytes.

In some embodiments, the data for the second protocol is composed at least partially of input from an HID.

In some embodiments, use of the second protocol is terminated through an extended abort process including transmission of an interrupt command. In some embodiments, the interrupt is a SET-INT command under MHL protocol.

In some embodiments, the apparatus is a video data source or video data sink. In some embodiments, the first protocol is MHL. In some embodiments, the second protocol is USB.

In some embodiments, the apparatus includes a module to convert between data between data of the first protocol and data of a third protocol. In some embodiments, the first protocol is MHL and the third protocol is HDMI. In some embodiments, the second protocol is USB.

In some embodiments, a method includes, at a first apparatus, transferring a first set of data to or from a second apparatus, the first set of data being in a first protocol, where transferring the first set of data includes transmitting or receiving data over a data channel for the first protocol via a connector; and, at the first apparatus, transferring a second set of data to or from the second apparatus, the second set of data being in a second protocol, optimization being applied to data of the second protocol before the data is sent over the control channel. Transferring the second set of data includes transmitting or receiving data over a control channel for the first protocol via the connector. The first set of data and the second set of data are transferred simultaneously at least in part, and the second set of data is transferred using one or more generic commands of the first protocol.

In some embodiments, the one or more generic commands of the method include a generic write command. In some embodiments, data channel includes one or more data transmission lines, and the data of the first protocol is transferred via the one more data transmission lines. In some embodiments, the control channel includes a control bus.

In some embodiments, the method further includes qualifying use of the second protocol through extended discovery, the extended discovery including exchange of information regarding capabilities for packet structure and service performance.

In some embodiments, the method further includes sending one or more messages of the second protocol in a single data burst of data transmission of the first protocol.

In some embodiments, the method includes coordinating each data burst through interrupt messages, and aggregating a plurality of the interrupt message and sending out the aggregated interrupt messages in a single message.

In some embodiments, an identification field of the first protocol through the control channel has a size of less than or equal to two bytes.

In some embodiments, the method further includes transferring other commands of the first protocol over the control channel, and wherein the one or more generic commands may be intermixed with the other commands of the first protocol. In some embodiments, the second set of data is composed at least partially of input from an HID.

In some embodiments, the method further includes terminating use of the second protocol through an extended abort process including transmission of an interrupt command.

In some embodiments, in the method the first protocol is MHL. In some embodiments, the second protocol is USB. In some embodiments, the one or more generic commands include MHL WRITE_BURST. In some embodiments, the one or more generic commands are enabled by a single SET_INT message to convey multiple separate generic events.

In some embodiments, a non-transitory computer-readable storage medium having stored thereon data representing sequences of instructions that, when executed by a processor, cause the processor to perform operations including, at a first apparatus, transferring a first set of data to or from a second apparatus, the first set of data being in a first protocol, where transferring the first set of data includes transmitting or receiving data over a data channel for the first protocol via a connector; and, at the first apparatus, transferring a second set of data to or from the second apparatus, the second set of data being in a second protocol. Transferring the second set of data includes transmitting or receiving data over a control channel for the first protocol via the connector, optimization being applied to the data of the second protocol before it is sent over the control channel for the first protocol. The first set of data and the second set of data are transferred simultaneously at least in part, and the second set of data is transferred using one or more generic commands of the first protocol.

In some embodiments, the one or more generic commands include a generic write command. In some embodiments, the data channel includes one or more data transmission lines, and wherein the data of the first protocol is transferred via the one more data transmission lines. In some embodiments, the control channel includes a control bus, and the data of the second protocol is transferred via the control bus.

In some embodiments, the medium includes instructions for qualifying use of the second protocol through extended discovery, the extended discovery including exchange of information regarding capabilities for packet structure and service performance.

In some embodiments, the medium includes instructions for sending one or more messages of the second protocol in a single data burst of data transmission of the first protocol. In some embodiments, the medium includes instructions for coordinating each data burst through interrupt messages, and aggregating a plurality of the interrupt message and sending out the aggregated interrupt messages in a single message.

In some embodiments, an identification field of the first protocol through the control channel has a size of less than or equal to two bytes.

In some embodiments, the medium includes instructions for transferring other commands of the first protocol over the control channel, and wherein the one or more generic commands may be intermixed with the other commands of the first protocol. In some embodiments, the second set of data is composed at least partially of input from an HID.

In some embodiments, the medium includes instructions for terminating use of the second protocol through an extended abort process including transmission of an interrupt command. In some embodiments, the protocol is MHL. In some embodiments, the second protocol is USB. In some embodiments, the one or more generic commands include MHL WRITE_BURST.

What is claimed is:

1. An apparatus comprising:
   a transmitter or receiver for the transmission or reception of data;
   a processing element for handling the data of the apparatus; and
   a connector for the transfer of the data, the connector to connect to a data channel and to connect to a control channel;
   wherein the processing element is to provide for transfer of data of a first protocol in the data channel, the processing element to further provide for transfer of data of a second protocol over the control channel, the transfer of data of the second protocol via the control channel including the use of one or more generic commands of the first protocol;
   wherein data of the second protocol is optimized before the data of the second protocol is sent over the first protocol; and
   wherein the transfer of data of the first protocol in the data channel and the transfer of data of the second protocol in the control channel are simultaneous at least in part.

2. The apparatus of claim 1, wherein the data channel includes one or more data transmission lines.

3. The apparatus of claim 1, wherein the control channel includes a control bus.

4. The apparatus of claim 1, wherein the transmission of data via the control channel also includes other commands of the first protocol, and wherein the one or more generic commands may be intermixed with the other commands of the first protocol.

5. The apparatus of claim 1, wherein use of the second protocol is qualified through extended discovery including discovery of capabilities regarding packet structure and service performance.

6. The apparatus of claim 1, wherein one or more messages of the second protocol can be sent in a single data burst of the first protocol.

7. The apparatus of claim 1, wherein an identification field of the first protocol through the control channel has a size of less than or equal to two bytes.

8. The apparatus of claim 1, wherein the data for the second protocol is composed at least partially of input from a human interface device (HID).

9. The apparatus of claim 1, wherein use of the second protocol is terminated through an extended abort process including transmission of an interrupt command.

10. The apparatus of claim 1, wherein the apparatus is a video data source or video data sink.

11. The apparatus of claim 1, wherein the apparatus includes a module to convert between data of the first protocol and data of a third protocol.

12. The apparatus of claim 6, wherein each data burst is coordinated through interrupt messages, wherein a plurality of the interrupt message are aggregated and sent out in a single message.

13. The apparatus of claim 9, wherein the interrupt is a SET-INT command under MHL™ (Mobile High-Definition Link) protocol.

14. The apparatus of claim 10, wherein the first protocol is MHL (Mobile HighDefinition Link).

15. The apparatus of claim 14, wherein the second protocol is USB™ (Universal Serial Bus).

16. The apparatus of claim 11, wherein the first protocol is MHL (Mobile HighDefinition Link) and the third protocol is HDMI™ (High-Definition Multimedia Interface).

17. The apparatus of claim 16, wherein the second protocol is USB (Universal Serial Bus).

18. A method comprising:
    at a first apparatus, transferring a first set of data, the first set of data being in a first protocol, where transferring the first set of data includes transmitting or receiving data over a data channel for the first protocol via a connector; and
    at the first apparatus, transferring a second set of data, the second set of data being in a second protocol, wherein transferring the second set of data includes transmitting or receiving data over a control channel for the first protocol via the connector, optimization being applied to data of the second protocol before the data of the second protocol is sent over the control channel for the first protocol;
    wherein the first set of data and the second set of data are transferred simultaneously at least in part;
    wherein the second set of data is transferred using one or more generic commands of the first protocol.

19. The method of claim 18, wherein the one or more generic commands include a generic write command.

20. The method of claim 18, wherein the data channel includes one or more data transmission lines.

21. The method of claim 18, wherein the control channel includes a control bus.

22. The method of claim 18, further comprising qualifying use of the second protocol through extended discovery, the extended discovery including exchange of information regarding capabilities for packet structure and service performance.

23. The method of claim 18, further comprising sending one or more messages of the second protocol in a single data burst of data transmission of the first protocol.

24. The method of claim 18, wherein an identification field of the first protocol through the control channel has a size of less than or equal to two bytes.

25. The method of claim 18, further comprising transferring other commands of the first protocol over the control channel, and wherein the one or more generic commands may be intermixed with the other commands of the first protocol.

26. The method of claim 18, wherein the second set of data is composed at least partially of input from a human interface device (HID).

27. The method of claim 18, further comprising terminating use of the second protocol through an extended abort process including transmission of an interrupt command.

28. The method of claim 18, wherein the first protocol is MHL (Mobile HighDefinition Link).

29. The method of claim 23, further comprising coordinating each data burst through interrupt messages, and aggregating a plurality of the interrupt message and sending out the aggregated interrupt messages in a single message.

30. The method of claim 28, wherein the second protocol is USB (Universal Serial Bus).

31. The method of claim 28, wherein the one or more generic commands includes MHL WRITE_BURST.

32. The method of claim 31, wherein the one or more generic commands are enabled by a single SET INT message to convey multiple separate generic events.

33. A non-transitory computer-readable storage medium having stored thereon data representing sequences of instructions that, when executed by a processor, cause the processor to perform operations comprising:
    at a first apparatus, transferring a first set of data to or from a second apparatus, the first set of data being in a first protocol, where transferring the first set of data includes transmitting or receiving data over a data channel for the first protocol via a connector; and
    at the first apparatus, transferring a second set of data to or from the second apparatus, the second set of data being in the second protocol, wherein transferring the second set of data includes transmitting or receiving data over a control channel for the first protocol via the connector, optimization being applied to data of the second protocol before the data of the second protocol is sent over the control channel for the first protocol;
    wherein the first set of data and the second set of data are transferred simultaneously at least in part;
    wherein the second set of data is transferred using one or more generic commands of the first protocol.

* * * * *